United States Patent
Watanabe et al.

(10) Patent No.: US 7,622,869 B2
(45) Date of Patent: Nov. 24, 2009

(54) DISCHARGE LAMP BALLAST AND PROJECTOR

(75) Inventors: Koji Watanabe, Kadoma (JP); Hirofumi Konishi, Hirakata (JP); Junichi Hasegawa, Neyagawa (JP); Katsuyoshi Nakada, Katano (JP); Toshiaki Sasaki, Hirakata (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 57 days.

(21) Appl. No.: 10/589,822

(22) PCT Filed: Sep. 7, 2004

(86) PCT No.: PCT/JP2004/012973

§ 371 (c)(1),
(2), (4) Date: Aug. 17, 2006

(87) PCT Pub. No.: WO2005/081589

PCT Pub. Date: Sep. 1, 2005

(65) Prior Publication Data
US 2007/0164687 A1    Jul. 19, 2007

(30) Foreign Application Priority Data
Feb. 24, 2004  (JP) .............................. 2004-048644

(51) Int. Cl.
H05B 37/02    (2006.01)

(52) U.S. Cl. ..................... 315/291; 315/224; 315/308

(58) Field of Classification Search ............ 315/209 R, 315/224–225, 246–247, 291, 307–308
See application file for complete search history.

(56) References Cited

U.S. PATENT DOCUMENTS

| 5,140,229 | A |  | 8/1992 | Yagi et al. |
|---|---|---|---|---|
| 5,142,203 | A |  | 8/1992 | Oda et al. |
| 5,485,061 | A |  | 1/1996 | Ukita et al. |
| 6,181,084 | B1 | * | 1/2001 | Lau ............................. 315/291 |
| 6,291,945 | B1 |  | 9/2001 | Toyama et al. |

(Continued)

FOREIGN PATENT DOCUMENTS

| EP | 1 150 336 A2 | 10/2001 |
|---|---|---|
| EP | 1 408 723 A2 | 4/2004 |
| JP | 4-12495 | 1/1992 |
| JP | 4-342993 | 11/1992 |
| JP | 2002-134287 | 5/2002 |

(Continued)

OTHER PUBLICATIONS

European Search Report mailed Mar. 5, 2009 issued in EP 04 78 7677.

(Continued)

Primary Examiner—David Hung Vu
Assistant Examiner—Tung X Le
(74) Attorney, Agent, or Firm—Edwards Angell Palmer & Dodge LLP

(57) ABSTRACT

A DC-DC converter 111 with a switching element Q11 changes a supply of power to a HID lamp DL1. On/off of the element Q11 is controlled with a control circuit 13. The circuit 13 controls an on/off state of the element Q11 with constant lamp power control on stable operation of the lamp. The circuit 13 controls the on/off state of the element Q11 so as to provide the lamp with lamp power larger than lamp power by the constant lamp power control based on high power control for a period of time that the lamp is on. It is possible to keep temperature of electrodes and within a bulb of the lamp in a proper state through simple control, and to prevent flicker generation and electrode degradation.

23 Claims, 18 Drawing Sheets

U.S. PATENT DOCUMENTS

| | | | |
|---|---|---|---|
| 6,362,575 B1 * | 3/2002 | Chang et al. | 315/224 |
| 6,437,515 B1 * | 8/2002 | Kamoi et al. | 315/209 R |
| 6,670,780 B2 | 12/2003 | Ono et al. | |
| 6,713,972 B2 | 3/2004 | Nakagawa et al. | |
| 6,958,580 B2 * | 10/2005 | Kamoi et al. | 315/291 |
| 6,992,718 B1 * | 1/2006 | Takahara | 348/333.09 |
| 7,064,495 B2 * | 6/2006 | Lurkens et al. | 315/224 |
| 7,141,937 B2 * | 11/2006 | Kumagai et al. | 315/224 |
| 2001/0038267 A1 | 11/2001 | Ono et al. | |
| 2002/0047643 A1 | 4/2002 | Takahashi et al. | |
| 2002/0105288 A1 | 8/2002 | Nakagawa et al. | |
| 2003/0062848 A1 * | 4/2003 | Prasad | 315/224 |
| 2003/0080693 A1 | 5/2003 | Ono et al. | |
| 2004/0075392 A1 | 4/2004 | Arimoto et al. | |
| 2004/0085027 A1 | 5/2004 | Nakagawa et al. | |
| 2004/0183473 A1 * | 9/2004 | Kamoi et al. | 315/291 |
| 2005/0007034 A1 * | 1/2005 | Kobayashi et al. | 315/291 |
| 2005/0151482 A1 | 7/2005 | Riederer et al. | |

FOREIGN PATENT DOCUMENTS

| | | |
|---|---|---|
| JP | 2002-175890 | 6/2002 |
| JP | 2002-532866 | 10/2002 |
| JP | 2002-352982 | 12/2002 |
| JP | 2003-77689 | 3/2003 |
| JP | 2003-133091 | 5/2003 |
| JP | 2003-151786 | 5/2003 |
| WO | WO 00/36882 | 6/2000 |
| WO | WO-03/096760 | 11/2003 |

OTHER PUBLICATIONS

Notification of Reasons for Refusal dated Dec. 14, 2004, issued in JP2004-048644.

Notification of Reasons for Refusal dated May 31, 2005, issued in JP2004-048644.

Notification of Reasons for Refusal dated Jun. 10, 2008, issued in JP2006-007991.

* cited by examiner

DISCHARGE LAMP BALLAST AND PROJECTOR

TECHNICAL FIELD

The invention relates to discharge lamp ballasts utilized for operating high intensity discharge lamps (HID lamps), and projectors equipped with the discharge lamp ballasts.

BACKGROUND ART

In conventional discharge lamp ballasts, HID lamps are operated by, for example, square wave voltage. In case of an extra high pressure mercury lamp utilized as a light source for a projector, square wave voltage with a comparatively low frequency (approx. 100s Hz) is applied across the lamp in order to prevent occurrence of acoustic resonance phenomenon (see, e.g., Japanese Patent Application Publication number 2002-352982).

In these sorts of applications, the arc length of the lamp is required to be as short as possible in order to approximate it to a point source. However, if the arc length is shortened, an arc generation point on an electrode gets unstable depending on the temperature or surface condition of the electrode, so that the phenomenon that the arc origin point jumps to other points is easy to occur. When this sort of phenomenon occurs, visible flicker is perceived in the light output of the lamp, and in case that the lamp is utilized as a light source for a projector, problems are raised, such as difficulty in seeing a screen image due to brightness fluctuation or luminance reduction on plane of projection (screen), or the like.

By the way, when lamp voltage across an HID lamp is high, its lamp current decreases and the temperature of electrodes and within a bulb of the lamp decreases, and therefore active chemical characteristics within the bulb are suppressed. When such phenomenon occurs in a metal halide lamp, its halogen cycle does not get active. Usually, a protrusion is formed on the surface of the electrode, and the protrusion serves as an arc origin so that the arc origin is stabilized, but the protrusion is difficult to be formed on the surface of the electrode in a condition that the active chemical characteristics within the bulb are suppressed, as described above. On account of this, the arc origin is not fixed, and the phenomenon that the arc origin moves is easy to occur. Also, if a protrusion is not formed on the surface of the electrode and the arc origin does not stabilize, the entire electrode suffers damage by the arc, resulting in early electrode degradation.

Incidentally, a technology for reducing flicker of a discharge lamp is suggested in, for example, Japanese Patent National Publication number 2002-532866. In this technology, the shape of a lamp current through the lamp is modified in accordance with detection of flicker generation.

A technology suggested in Japanese Patent Application Publication number 2002-134287 gradually increases an instantaneous value of power supplied to a discharge lamp as time is passed in a half period of a lamp current through the lamp.

According to the technologies described in the Patent Application Publication number 2002-352982 and the Patent National Publication number 2002-532866, electrode wear is controlled. The latter especially directs its attention to reduction of flicker, but there is a need to superpose a pulse-shaped current in order to modify the shape of the lamp current through the lamp, so that a comparatively complicated control is required.

A technology described in the Patent Publication number 2002-134287 changes the instantaneous value of power supplied to the lamp and also changes each wave form of voltage applied across the lamp or the lamp current into wave form except square wave. Therefore a comparatively complicated control is required.

SUMMARY OF THE INVENTION

It is therefore an object of the present invention to keep the temperature of electrodes or within a bulb of a HID lamp in a proper state through simple control.

Another object of the present invention is to stabilize an arc origin point by promoting formation of a protrusion on an electrode, and thereby prevent flicker generation and electrode degradation to extend life of a HID lamp.

A discharge lamp ballast of the present invention comprises a power converter and a control circuit. The converter includes at least one switching element and is connected between a power source and an HID lamp. After the start of the lamp, the control circuit controls an on/off state of the switching element so as to provide prescribed lamp power for the lamp based on lamp power control. According to one aspect of the invention, the control circuit controls the on/off state of the switching element so that at least one of an effective value and a peak value of the lamp power provided for the lamp is increased more than that adjusted by constant power control based on high power control after the start of the lamp. The constant power control is control for adjusting the effective value of the lamp power provided for the lamp to a prescribed power value. Thus, by controlling the on/off state of the switching element based on the high power control, it is possible to keep temperature of electrodes or within a bulb of the lamp in a proper state. As a result, since formation of a protrusion on the electrode can be promoted and an arc origin point can be stabilized, flicker generation and electrode degradation are prevented and the life of the lamp can be extended.

Preferably, the ballast comprises a state detection means that detects a state of the lamp, and the control circuit changes the lamp power control to the constant power control or the high power control based on a detection result of the state detection means after the start of the lamp. In case of the constant power control, the control circuit controls the on/off state of the switching element so as to adjust the effective value of the lamp power provided for the lamp to the prescribed power value. In case of the high power control, the control circuit controls the on/off state of the switching element so that at least one of the effective value and the peak value of the lamp power provided for the lamp is increased more than that of the constant power control.

The prescribed power value may be a rated power value of the lamp. The prescribed power value may also be a rated power value of the lamp and a dimming power value obtained from a dimming rate for the rated power value.

Preferably, the state detection means detects lamp voltage across the lamp, and the control circuit changes the lamp power control to the high power control in case that the detection result of the state detection means reaches or exceeds threshold voltage higher than rated lamp voltage of the lamp. In this configuration, the lamp power can be increased in a period of time that temperature of the electrodes or within the bulb of the lamp is regarded as reducing, and therefore reduction of the temperature can be prevented.

The control circuit may change the lamp power control to the high power control while the detection result of the state detection means is equal to or higher than the threshold voltage, and change the lamp power control to the constant power control while the detection result of the state detection means is lower than the threshold voltage.

As another example of this, the control circuit may change the lamp power control to the high power control over a prescribed time period, and change the lamp power control to the constant power control after the prescribed time period is passed. The prescribed time period is included in a period of time while the detection result of the state detection means is equal to or higher than the threshold voltage.

It is desirable that the control circuit controls the on/off state of the switching element based on the high power control for a prescribed time period immediately after reaching a stable state of the lamp. In this configuration, the lamp power can be increased in a period of time such as needed for stabilization of electrode temperature of the lamp from the start of arc discharge, and therefore it is possible to rapidly raise the temperature of the electrodes or within the bulb of the lamp.

After reaching a stable state of the lamp, control for the on/off state of the switching element based on the constant power control and control for the on/off state of the switching element based on the high power control may be performed alternately and periodically through the control circuit. According to this control, even if there are different variations such as variation of ambient conditions, fluctuation of power voltage and so on during operation of the lamp, it becomes easy to maintain temperature of the electrodes or within the bulb of the lamp, and in consequence flicker generation and electrode degradation can be prevented.

It is desirable that the state detection means detects the state of the lamp for detecting flicker generation on the lamp and the control circuit detects the flicker generation on the lamp based on the detection result of the state detection means. In case that the flicker generation is detected, the control circuit changes the lamp power control to the high power control. According to such control, flicker can be prevented by raising temperature of the electrodes or within the bulb of the lamp in case of flicker generation. Moreover, since lamp power is not increased in a period of time that flicker is not generated, needlessly large power is not supplied to the lamp, and stress onto the lamp is comparatively few. Increase of power consumption can be also prevented.

The control circuit may change the lamp power control to the high power control while the flicker generation is detected, and change the lamp power control to the constant power control while the flicker generation is not detected.

The control circuit may change the lamp power control to the high power control for a prescribed time period in case that the flicker generation is detected, and change the lamp power control to the constant power control after the prescribed time period is passed. According to this control, flicker can be prevented by raising temperature of the electrodes or within the bulb of the lamp in case of flicker generation. Even if flicker stops immediately in response to increase of lamp power, lamp power is increased for the prescribed time period, and therefore it is possible to sufficiently raise temperature of the electrodes or within the bulb of the lamp. Inversely, if flicker does not stop, the high power control is changed to the constant power control, and therefore useless power consumption can be prevented.

It is desirable that the state detection means is constructed of at least one means of: a means that detects lamp voltage applied across the lamp; a means that detects a lamp current supplied to the lamp; and a means that detects a light output of the lamp. Flicker generation can be judged by using any of the lamp voltage, the lamp current and actual light output. Factors are compounded and utilized, and thereby flicker generation can be detected without errors.

The control circuit may detect flicker generation when a change value in the detection result is equal to or greater than a prescribed value. The change value is a value per unit time. In case of this, since flicker is judged to be generated when the change value becomes large, flicker can be detected without delay.

The control circuit may find the number of cases in which the change value becomes equal to or greater than the prescribed value every a judgment time period longer than the unit time, and detect flicker generation when the number of cases is equal to or greater than a specified number of times. According to this control, flicker generation can be correctly detected by recognizing similar condition to flicker awareness condition of human.

Preferably, the control circuit executes correction control or non-correction control as the high power control. In case of the correction control, the control circuit controls the on/off state of the switching element so that a part of lamp power provided for the lamp is increased more than that adjusted by the constant power control while equalizing the effective value of the lamp power provided for the lamp with that adjusted by the constant power control. In case of the non-correction control, the control circuit controls the on/off state of the switching element so that a part of lamp power provided for the lamp is increased more than that adjusted by the constant power control. According to this control, it is possible to raise temperature of the electrodes of the lamp to keep the light output in a stable state.

It is desirable that the power converter comprises: a converter that includes the switching element and converts voltage from the power source into DC voltage; and an inverter that includes switching elements and inverts the DC voltage from the converter into square wave voltage. In this configuration, the control circuit controls the on/off period of the switching element of the converter so as to increase a lamp current provided by component of at least a half-period of the square wave voltage while the number of half-period pulses of the square wave voltage reaches a specified number of times, in case of the high power control. As a result, temperature of the electrodes of the lamp can be maintained, and stabilization of light output is possible.

The control circuit may control the on/off period of the switching elements of the inverter so that time of half-period in which the lamp current is increased differs from time of half-period in which the lamp current is not increased. Since time for increasing the lamp current is also adjusted in addition to increase of the lamp current, compatibility between fitness for specification of the lamp and retention of electrode temperature is possible by adjusting the time even in case that it is difficult to achieve the compatibility only by the lamp current.

It is desirable that the ballast comprises a state detection means that detects a state of the lamp and the control circuit changes frequent degree of increase of the lamp current based on the detection result of the state detection means when the lamp current provided by the component of at least a half-period of the square wave voltage is increased. According to this control, since frequent degree of increase of the lamp current is also adjusted in addition to increase of the lamp current, compatibility between fitness for specification of the lamp and retention of electrode temperature is possible by adjusting the frequent degree even in case that it is difficult to achieve the compatibility only by the lamp current.

The ballast may comprise a state detection means that detects a state of the lamp, and the control circuit may change peak of the lamp current based on the detection result of the state detection means when the lamp current provided by the component of at least a half-period of the square wave voltage is increased. According to this control, since a peak value of the lamp current is also adjusted in addition to increase of the lamp current, compatibility between fitness for specification of the lamp and retention of electrode temperature is possible by adjusting the peak value even in case that it is difficult to achieve the compatibility only by the lamp current.

Preferably, the ballast comprises a state detection means that detects a state of the lamp, and the control circuit changes frequent degree of increase of the lamp current and peak of the lamp current based on the detection result of the state detection means when the lamp current provided by the component of at least a half-period of the square wave voltage is increased. According to this control, the adjusting range becomes wider.

A projector of the present invention equips with the above ballast and the lamp as a light source.

Preferably, the projector comprises a color filter whose transmission color by light from the light source is timewise changed with a prescribed period, and the control circuit synchronizes timing of polarity inversion of lamp voltage applied across the lamp with timing that the transmission color of the color filter is changed. According to this configuration, in case that color image is displayed by timewise changing transmission color of the filter with a prescribed period, light in a period of time that a light output of the light source is high is utilized as transmitted light of each color region of the color filter, while light in a period of time that the light output decreases due to timing of polarity inversion of the lamp voltage is not utilized. Therefore, light from the light source is utilized efficiently.

BEST MODE FOR CARRYING OUT THE INVENTION

FIRST EMBODIMENT

Figure 1:
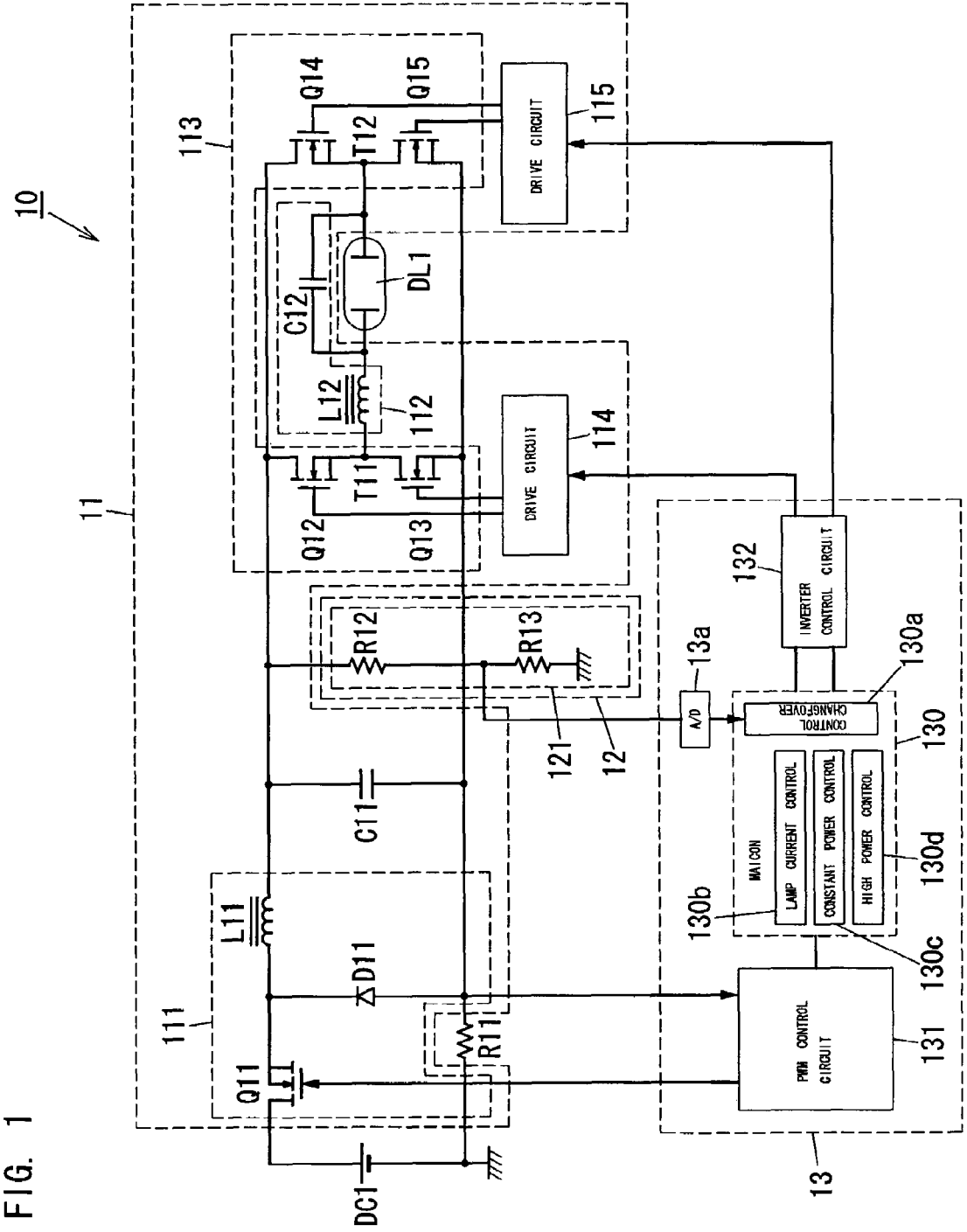
FIG. 1 is a circuit diagram of a discharge lamp ballast in accordance with a preferable first embodiment of the invention.

FIG. 1 shows a discharge lamp ballast 10 for an HID lamp (e.g., extra-high-pressure mercury discharge lamp of 120-300 W) DL1. The ballast 10 comprises a resistor R11 for detecting an input current, a state detection circuit 12, a control circuit 13 and an igniter (not shown), and further comprises a power converter 11 connected between a DC power source DC1 with a positive terminal and a negative terminal and an HID lamp DL1 with a first terminal and a second terminal. In order to start the lamp DL1, the igniter generates and applies high voltage to the lamp DL1.

The power converter 11 comprises a DC-DC converter 111, a LC series circuit 112, an inverter 113 with output terminals T11 and T12, and drive circuits 114 and 115, and further comprises a capacitor (smooth condenser) C11 that provides DC power from the DC-DC converter 111 for the lamp DL1.

The DC-DC converter 111 can be constructed of, for example, a voltage step down converter having a diode D11, a switching element Q11 and an inductor L11. The diode D11 has a cathode and an anode, and the anode is connected to the negative terminal of the DC power source DC1 via the resistor R11, and also connected to the negative voltage side of the capacitor C11.

The switching element Q11 is connected between the cathode of the diode D11 and the positive terminal of the DC power source DC1. This element Q11 is a power MOSFET with a diode (body diode), and its drain and source are connected to the positive terminal of the source DC1 and the cathode of the diode D11, respectively. A cathode and an anode of the body diode are also connected to the drain and the source of the power MOSFET, respectively. The inductor L11 is connected between the cathode of the diode D11 and the positive voltage side of the capacitor C11.

This DC-DC converter 111 flows a charging current from the DC power source DC1 to the capacitor C11 through the inductor L11 during turn-on of the switching element Q11, and releases energy in the inductor L11 to the capacitor C11 via the diode D11 during turn-off of the switching element Q11.

The LC series circuit 112 is constructed of a capacitor C12 connected in parallel with the lamp DL1 and an inductor L12 connected in series with the combination of the lamp DL1 and the capacitor C12, and is connected between the output terminals T11 and T12 of the inverter 113.

The inverter 113 is constructed of switching elements Q12-Q15, and converts DC voltage from the capacitor C11 into square wave voltage to be applied across the LC series circuit 112 and thereby provides AC power for the lamp DL1. Each of the elements Q12-Q15 is a power MOSFET with a diode (body diode). The element Q12 is connected to the positive voltage side, and its drain and source are connected to the positive voltage side (positive terminal) of the capacitor C11 and the output terminal T11, respectively. The element Q13 is connected to the negative voltage side, and its drain and source are connected to the output terminal T11 and the negative voltage side (negative terminal) of the capacitor C11, respectively. The element Q14 is connected to the positive voltage side, and its drain and source are connected to the positive terminal of the capacitor C11 and the output terminal T12, respectively. The element Q15 is connected to the negative voltage side, and its drain and source are connected to the output terminal T12 and the negative terminal of the capacitor C11, respectively.

The drive circuits 114 and 115 are constructed of, for example, IR2111 made by IR company each, and alternately turns the switching elements Q12 and Q15 and the switching elements Q13 and Q14 on/off in response to control signals from the control circuit 13.

The state detection circuit 12 includes a voltage division circuit 121 having resistors R12 and R13 that are connected in series, and detects a state of the lamp DL11. The circuit 121 is connected in parallel with the capacitor C11 and the resistor R11. Voltage across the resistor R13 is proportional to output voltage of the DC-DC converter 111 (voltage across the capacitor C11), and represents lamp voltage across the lamp DL1. Accordingly, the circuit 12 detects the output voltage of the converter 111 and the lamp voltage.

The control circuit 13 includes an A/D converter 13a, a PWM (pulse width modulation) control circuit 131, an inverter control circuit 132 and a micon (microcomputer) 130. The circuit 13 respectively monitors an input current and the output voltage of the DC-DC converter 111 (or lamp voltage) by monitoring voltage across the resistor R11 and voltage across the resistor R13, and controls an on/off state of each switching element of the power converter 11 based on the input current and the output voltage (lamp voltage).

The A/D converter 13a converts detection result of the state detection circuit 12 (output voltage of the DC-DC converter 111 or lamp voltage) into digital. The voltage across the resistor R13 is directly applied to the converter 13a because it is proportional to voltage smoothed through the capacitor C11 and constant within a sampling period of the converter 13a.

The PWM control circuit 131 generates a pulse shaped control signal from triangular wave or saw tooth wave voltage having a prescribed frequency in response to a target current or correction quantity on output power of the DC-DC converter 111 from the micon 130, and provides the control signal for the switching element Q11. In case that the target current is supplied from the micon 130, the circuit 131 generates the control signal for equalizing the input current from the resistor R11 with the target current. Since the input current from the resistor R11 represents the output current of the converter 111, the output current is made equal to the target current. In case that the correction quantity on the output power is supplied from the micon 130, the circuit 131 finds correction quantity on the output voltage by dividing the correction quantity on the output power by the input current from the resistor R11 (output current of converter 111), and generates a control signal that becomes turn-on (High) when the triangular wave or saw tooth wave voltage equals or exceeds threshold voltage varied in response to the correction quantity on the output voltage.

The inverter control circuit 132 generates two phases of control signals according to drive instruction from the micon 130, and provides the signals for the drive circuits 114 and 115, respectively.

The micon 130 is constructed of, for example, a M37540 made by Mitsubishi company, and has a function for providing the above drive instruction for the inverter control circuit 132 after the start of the lamp DL1. In addition, the micon 130 has various functions such as a control changeover function 130a, a lamp current control function 130b, a constant power control function 130c, a high power control function 130d and so on. The micon 130 also stores data such as various tables, various target values and so on.

The control changeover function 130a is operable to change control for the lamp DL1 to lamp current control of the lamp current control function 130b at the start of the lamp DL1, and then change the lamp control to constant power control of the constant power control function 130c at stabilization of the lamp DL1. The stabilization of the lamp DL1 is judged based on the detection result from the A/D converter 13a (the output voltage). Namely, lamp voltage immediately after the start of the lamp DL1 is low voltage, and therefore a start time period is set for a period of time that voltage across the resistor R13 is lower than reference voltage. The reference voltage is previously set based on voltage across the lamp DL1 in its stable operation. Accordingly, when the voltage across the resistor R13 reaches or exceeds the reference voltage, the lamp DL1 is judged to reach a stable state.

The control changeover function 130a is also operable to change lamp power control to constant power control or high power control based on the detection result from the A/D converter 13a (lamp voltage) after stabilization of the lamp DL1. A detailed explanation of this is given later.

The lamp current control function 130b is operable to supply a target current for lamp current control to the PWM control circuit 131 according to changeover control of the control changeover function 130a. In order to shorten rise time of the light output, a target value of the target current is set to a value for flowing a comparatively large lamp current (current larger than the rated lamp current) in a prescribed time period immediately after the start. Since this lamp current control raises mercury vapor pressure and the light output of the lamp DL1 in a short time, such control is generally utilized for projectors or headlights of automobiles.

The constant power control function 130c is operable to supply correction quantity on output (lamp) power for the constant power control to the PWM control circuit 131 according to the changeover control of the control changeover function 130a. The correction quantity is to adjust an effective value of lamp power provided for the lamp DL1 to a prescribed power value (rated power value or dimming power value). In the operation, the correction quantity is calculated based on the detection result from the A/D converter 13a (the output voltage) and a table for the constant power control. In the table for the constant power control, each detection result from the converter 13a (output voltage value) is previously related to an output (lamp) power control value. Accordingly, the function 130c converts the detection result into an output power control value by reading out the output power control value corresponding to the detection result from the table for the constant power control, and finds difference between the output power control value and the output (lamp) power target value, as the correction quantity on output power. This constant power control is generally changed in order to stably keep lamp power of the lamp DL1 during steady operation after the lamp current control of the lamp current control function 130b.

The high power control function 130d is operable to supply correction quantity on output power for the high power control to the PWM control circuit 131 according to the changeover control of the control changeover function 130a. The correction quantity is to increase at least one of an effective value and a peak value of the lamp power provided for the lamp DL1 more than that adjusted with the constant power control function 130c. In the operation, the correction quantity is calculated based on the detection result from the A/D converter 13a (the output voltage) and a table for the high power control.

Figure 2:
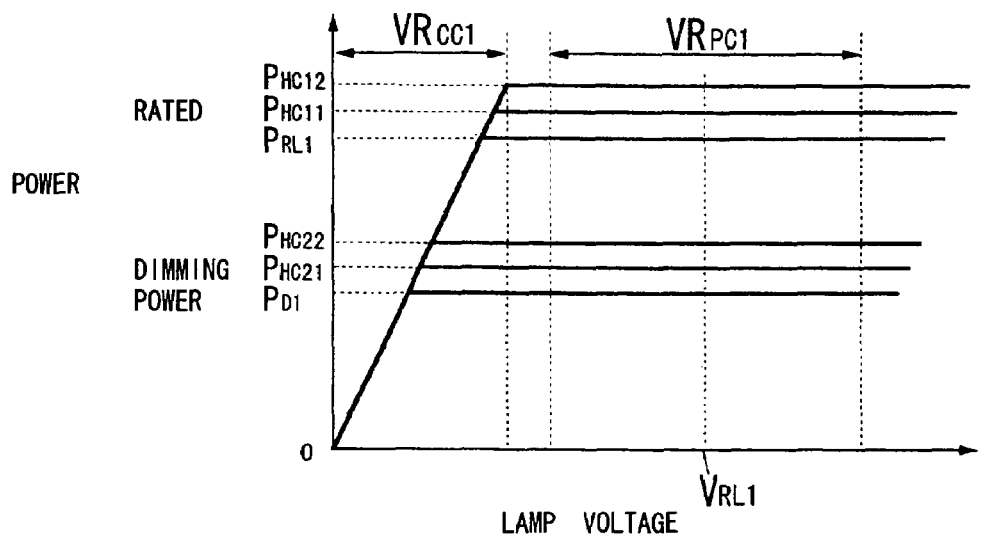
FIG. 2 is an explanatory diagram concerning lamp control changeover of the ballast of FIG. 1.

The high power control function 130d also utilizes an output power target value larger than that of the constant power control function 130c. For example, as shown in FIG. 2, any output power target value is selected and utilized from output power target values in case of the rated power or each dimming power.

In case of the rated power, the constant power control function 130c utilizes a first rated target as an output power target value, while the high power control function 130d utilizes a second rated target and a third rated target of output power target values. By utilizing the second rated target larger than the first rated target, output power is set to output power $P_{HC11}$ larger than the rated power $P_{RL1}$. By utilizing the third rated target larger than the second rated target, output power is set to output power $P_{HC12}$ larger than the output power $P_{HC11}$. The second rated target or the third rated target is set based on a prescribed condition such as, for example, ambient temperature or the like. In case that ambient temperature is utilized as the prescribed condition, the second rated target is selected when ambient temperature is lower than first reference temperature, and the third rated target is selected when ambient temperature is lower than second reference temperature that is lower than the first reference temperature.

In case of dimming power, the constant power control function 130c utilizes a first dimming target as an output power target value, while the high power control function 130d utilizes a second dimming target and a third dimming target of output power target values. By utilizing the second dimming target larger than the first dimming target, output power is set to output power $P_{HC21}$ larger than dimming power $P_{D1}$. By utilizing the third dimming target larger than the second dimming target, output power is set to output power $P_{HC22}$ larger than the output power $P_{HC21}$. The second dimming target or the third dimming target is set based on a prescribed condition such as, for example, ambient temperature or the like. In case that ambient temperature is utilized as this prescribed condition, the second dimming target is selected when ambient temperature is lower than first reference temperature, and the third dimming target is selected when ambient temperature is lower than second reference temperature that is lower than this first reference temperature.

Figure 3:
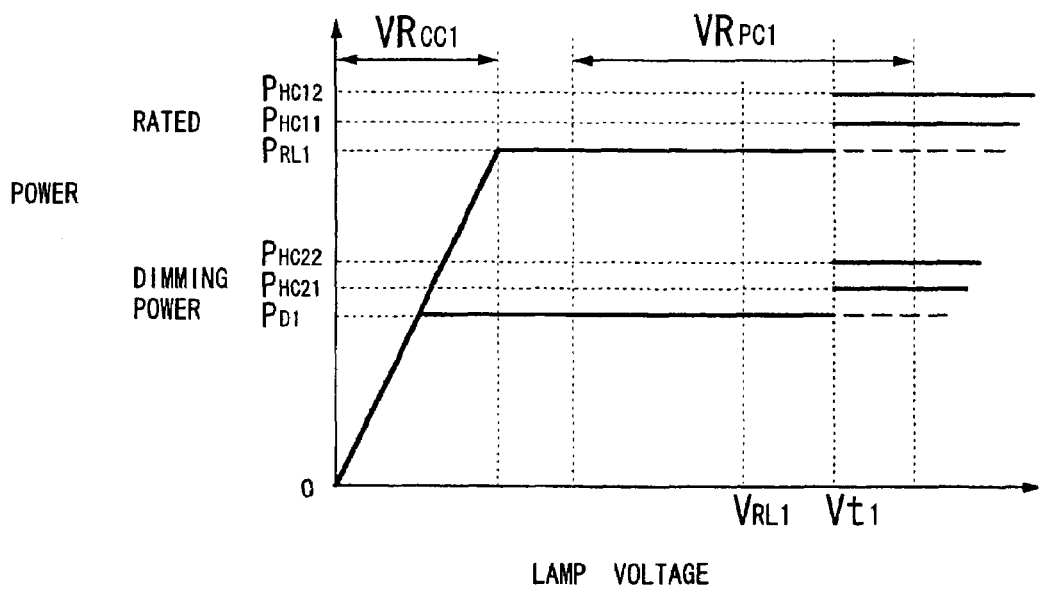
FIG. 3 is an explanatory diagram concerning lamp control changeover of the ballast of FIG. 1.

The above control changeover function 130a is further explained. In case of the HID lamp DL1, visible lamp flicker occurs when temperature of electrodes and within a bulb thereof falls. On account of this, as shown in FIG. 3, after stabilization of the lamp DL1, the function 130a changes lamp power control to the high power control when the lamp voltage (voltage across R13) reaches or exceeds threshold voltage $V_{t1}$ that is higher than the rated lamp voltage $V_{RL1}$, and changes power control to the constant power control when the lamp voltage is less than the threshold voltage $V_{t1}$. The threshold voltage $V_{t1}$ for the rated operation may be the same as or different from that for the dimming operation. In FIGS. 2 and 3, $VR_{CC1}$ represents a voltage range in the start time period, and $VR_{PC1}$ represents a voltage range utilized after the start time period of the lamp DL1 and this range is set so as to include the voltage $V_{RL1}$ at intermediate portion thereof.

The operation of the ballast 10 is now explained. When the lamp DL1 starts with high voltage of the igniter, control for the lamp DL1 is changed to the lamp current control. Accordingly, the lamp power rises as shown in FIGS. 2 and 3.

Subsequently, when the lamp DL1 reaches a stable state, the lamp current control is changed to the constant power control.

Then, when temperature of the electrodes or within the bulb of the lamp DL1 falls owing to decrease of the lamp current and the lamp voltage reaches and exceeds the threshold voltage $V_{t1}$, the constant power control is changed to the high power control.

Thus, by changing the constant power control to the high power control when temperature of the electrodes or within the bulb of the lamp DL1 falls, the ballast 10 according to the first embodiment of the invention is able to prevent decrease of temperature of the electrodes or within the bulb.

Figure 4:
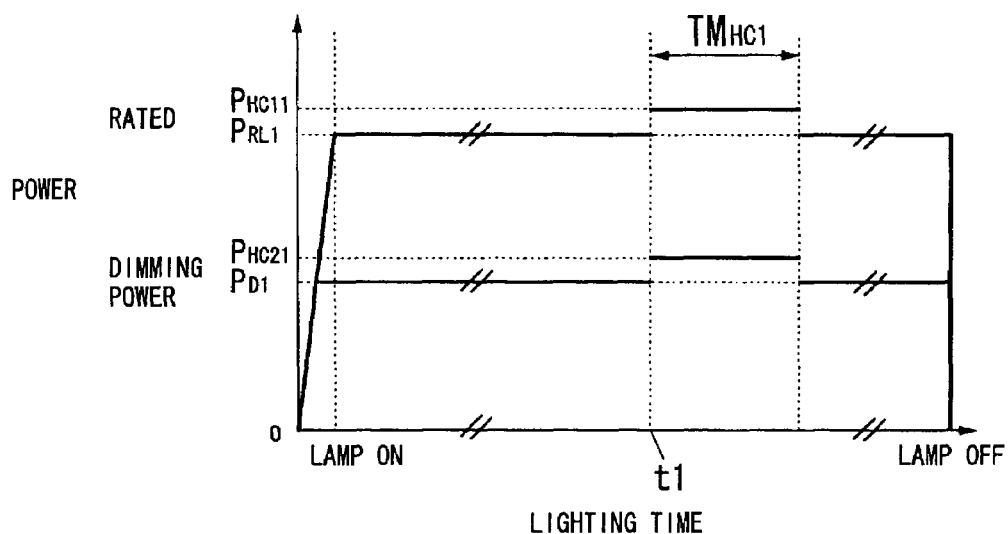
FIG. 4 is an explanatory diagram concerning another lamp control changeover of the ballast of FIG. 1.

In an alternate embodiment, as shown in FIG. 4, the control changeover function 130a is operable to change lamp power control to the high power control over a prescribed time period $TM_{HC1}$, and change lamp power control to the constant power control after the prescribed time period $TM_{HC1}$ is passed. The prescribed time period is included in a period of time while the detection result of the state detection circuit 12 is equal to or higher than the threshold voltage $V_{t1}$. Namely, timing for returning the high power control to the constant power control is controlled by using a timer function of the micon, i.e., time. In FIG. 4, t1 shows a point in time that the detection result of the state detection circuit 12 reaches the threshold voltage $V_{t1}$. In case of this changeover control, when temperature of the electrodes or within the bulb of the lamp DL1 falls, the lamp current is increased for the prescribed time period $TM_{HC1}$, and therefore it is possible to prevent rise of temperature of the electrodes or within the bulb while preventing drop of the temperature thereof.

Figure 5:
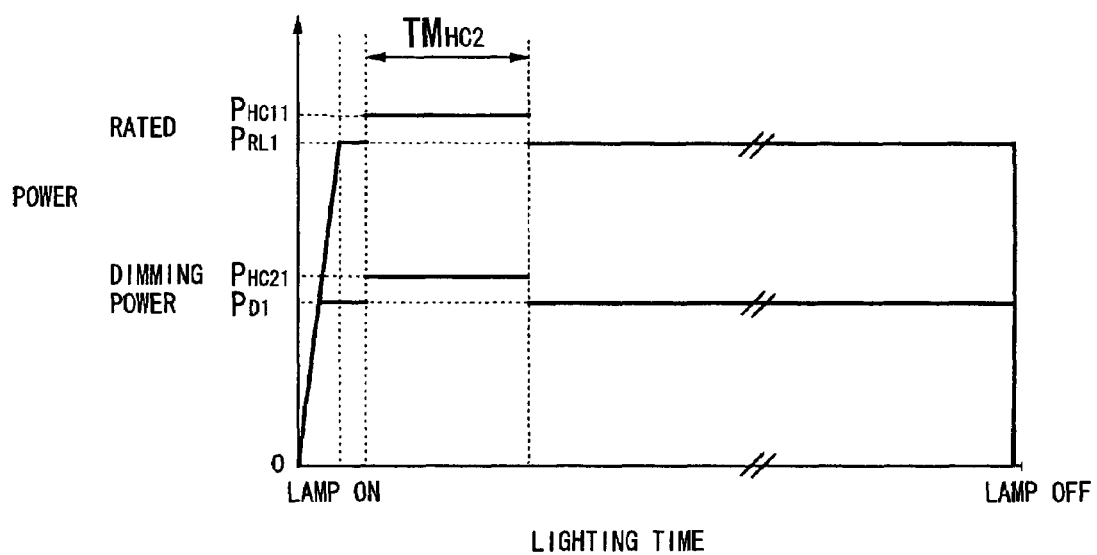
FIG. 5 is an explanatory diagram concerning another lamp control changeover of the ballast of FIG. 1.

In another alternate embodiment, as shown in FIG. 5, the control changeover function 130a is operable: to change control for the lamp DL1 to the lamp current control after the start of the lamp DL1; to change lamp power control to the high power control for a prescribed time period $TM_{HC2}$ immediately after reaching a stable state of the lamp DL1 (near after reaching the stable state); and to change lamp power control to the constant power control after the prescribed time period $TM_{HC2}$. In case of this changeover control, since the lamp current is increased for a period of time such as needed for stabilization of electrode temperature of the lamp DL1 from the start of arc discharge, temperature of the electrodes or within the bulb can be raised rapidly and the temperature can be stabilized easily.

Figure 6:
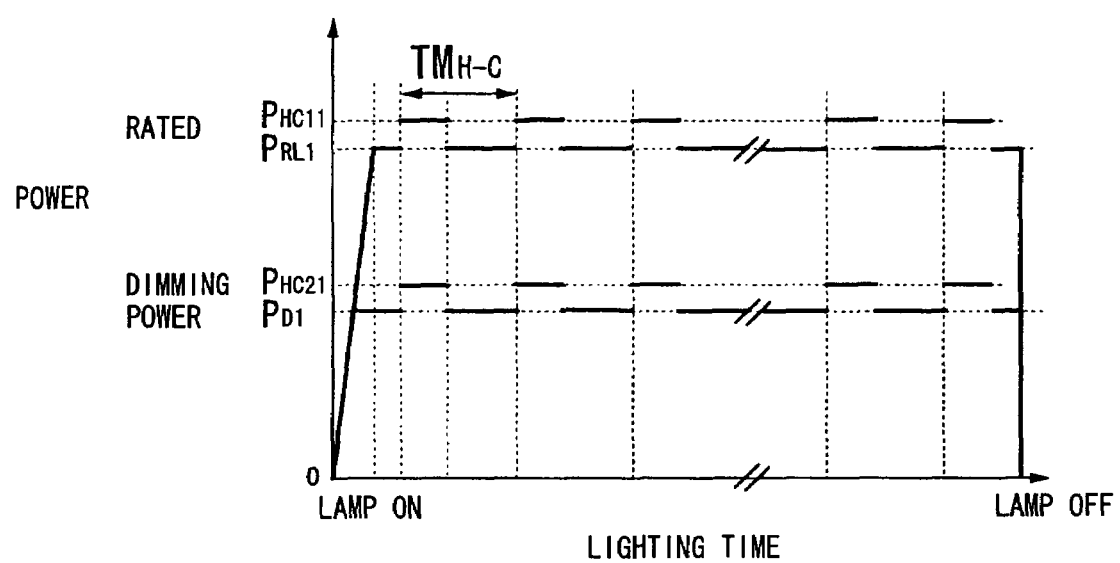
FIG. 6 is an explanatory diagram concerning another lamp control changeover of the ballast of FIG. 1.

In other alternate embodiment, as shown in FIG. 6, the control changeover function 130a is operable to change control for the lamp DL1 to the lamp current control after the start of the lamp DL1, and change lamp power control to the high power control or the constant power control alternately and periodically after reaching a stable state of the lamp DL1. In FIG. 6, $TM_{H-C}$ shows a period of changeover of the high power control and the constant power control. In case of the changeover control, even if there are different variations such as variation of ambient environment, fluctuation of power voltage and so on, it is possible to easily maintain temperature of the electrodes or within the bulb of the lamp DL1, and electrode degradation and visible flicker generation can be prevented.

SECOND EMBODIMENT

Figure 7:
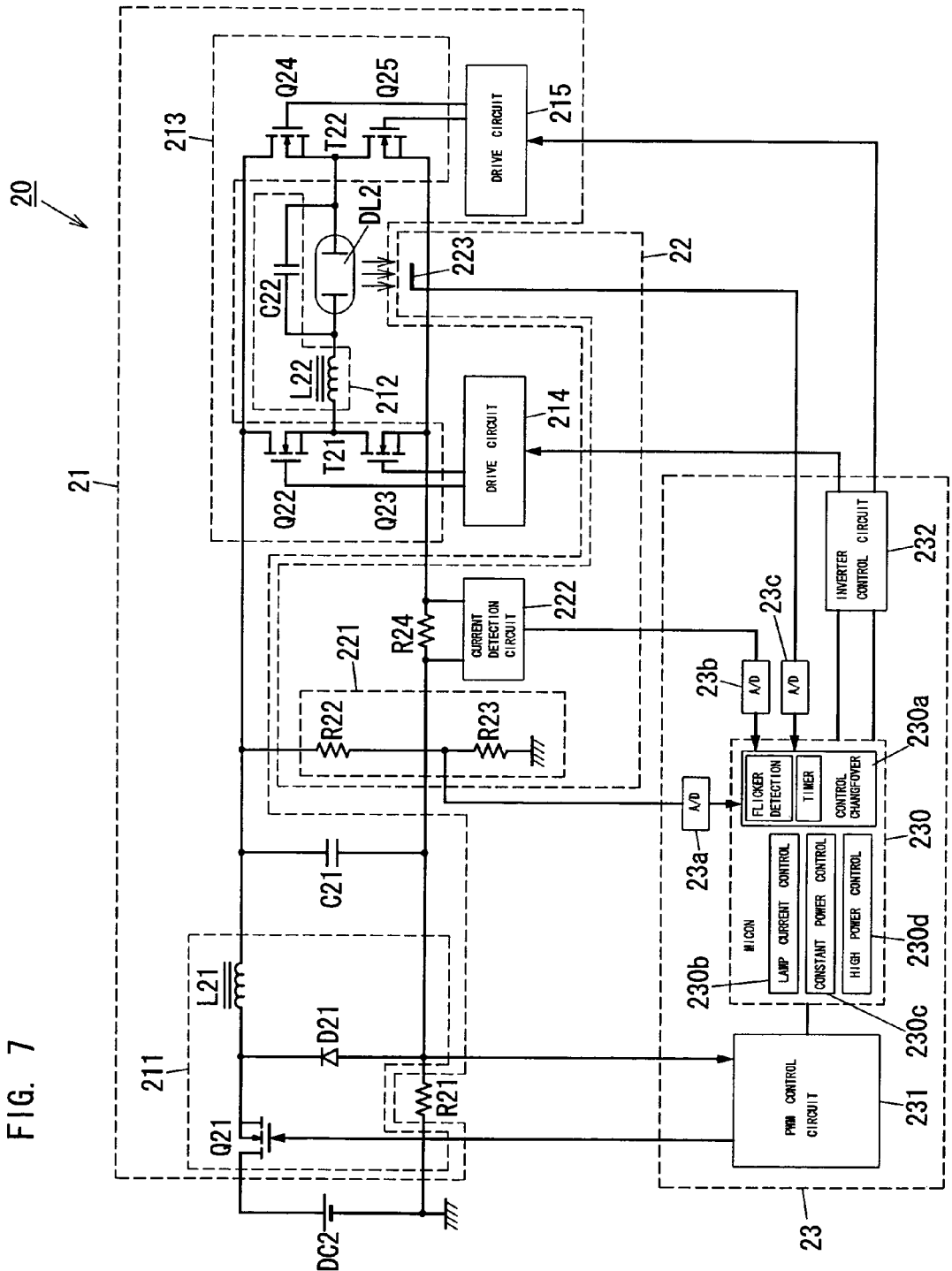
FIG. 7 is a circuit diagram of a discharge lamp ballast in accordance with a preferable second embodiment of the invention.

FIG. 7 shows a discharge lamp ballast 20 for a HID lamp (e.g., extra-high-pressure mercury discharge lamp of 120-300 W) DL2. The ballast 20 is characterized by a state detection circuit 22 and a control circuit 23, and different from the first embodiment that the state detection circuit 12 is constructed of the voltage division circuit 121 and the control circuit 13 is constructed of the A/D converter 13a, the micon 130, the PWM control circuit 131 and the inverter control circuit 132.

In this second embodiment, the state detection circuit 22 comprises a voltage division circuit 221 similar to the voltage division circuit 121, and also comprises a resistor R24 with small resistance, a current detection circuit 222 and a light output detection circuit 223.

The resistor R24 is connected between a negative voltage side of a capacitor C21 (negative terminal) and sources of switching elements Q23 and Q25, and detects voltage corresponding to a lamp current through the lamp DL2. Voltage across the resistor R24 is low voltage due to the small resistance and fluctuates with switching of a inverter 213. On account of this, the current detection circuit 222 is provided.

This circuit 222 includes a filter and an amplification circuit, and appropriately amplifies the voltage across the resistor R24. The light output detection circuit 223 includes a light receiving element such as, for example, a photodiode or the like, and is located in proximity to the lamp DL2 to detect a light output of the lamp DL2.

The control circuit 23 comprises A/D converters 23b and 23c, and a micon 230 in addition to an A/D converter 23a, a PWM control circuit 231 and an inverter control circuit 232. The converter 23b converts an analog output corresponding to a lamp current from the current detection circuit 222 into digital. The converter 23c converts an analog output representing a light output of the lamp DL2 from the light output detection circuit 223 into digital.

The micon 230 is characterized by a control changeover function 230a including a timer function and a flicker detection function in comparison with the micon 130 of the first embodiment. The timer function of the function 230a is utilized for a time limit of the high power control, and operable to time a prescribed time period.

Figure 8:
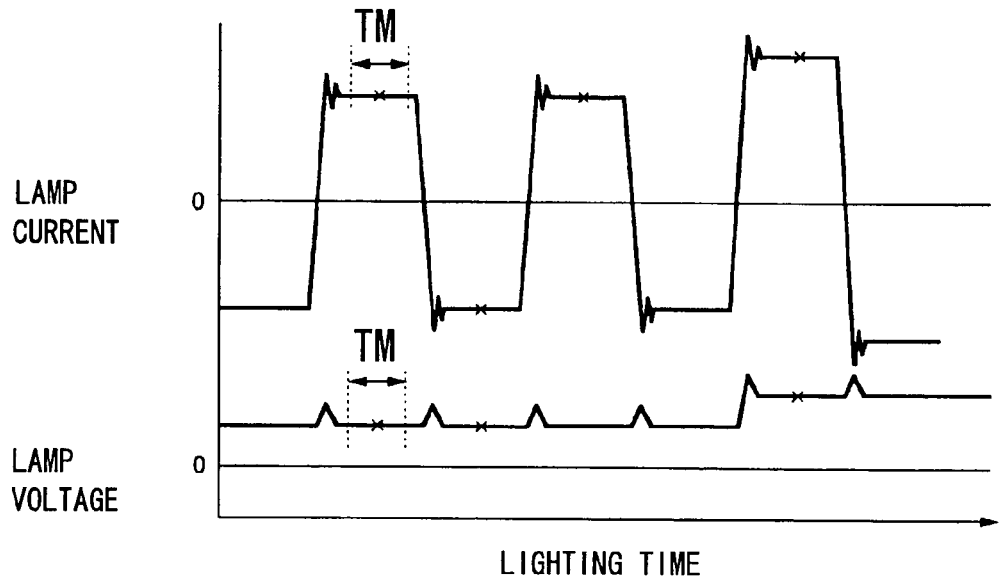
FIG. 8 is an explanatory diagram concerning process of a flicker detection function in the ballast of FIG. 7.

As shown in FIG. 8, the flicker detection function of the function 230a is operable to use each digital value from the A/D converters 23a-23c every time period TM between neighboring polarity inverting timings of output voltage (square wave voltage) of the inverter 213 Accordingly, it is possible to eliminate digital values under influence of overshoot at polarity inverting from each digital value of the converters 23a-23c, so that it is possible to use digital values without influence of the overshoot. The start timing of the time period TM is set for, for example, a point in time after a prescribed time from the polarity inverting of rising. In another example, the flicker detection function may hold a value of detection factor every period of output voltage of the inverter 213, calculate a mean value of the values of the detection factors over the periods, and use the mean value.

The flicker detection function of the function 230a is also operable to detect flicker generation on the lamp DL2 based on each detection result of the state detection circuit 22. In the second embodiment, the flicker generation is detected based on at least one of digital values corresponding to the lamp voltage from the A/D converter 23a, digital values corresponding to the lamp current from the A/D converter 23b and digital values corresponding to the light output of the lamp DL1 from the A/D converter 23c.

Figure 9:
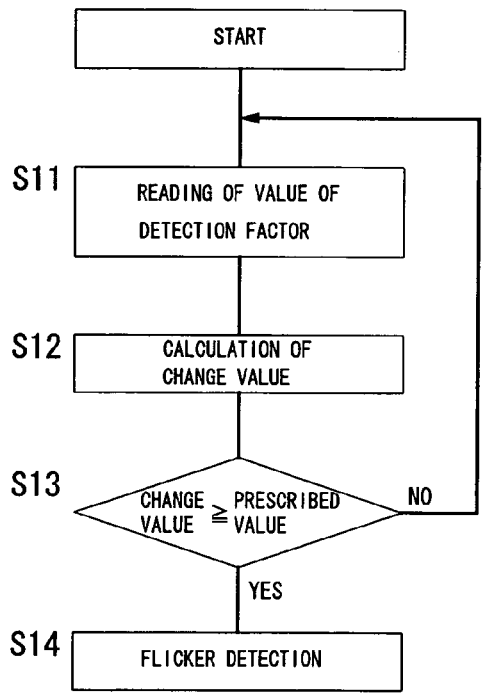
FIG. 9 illustrates an operation example of the flicker detection function of FIG. 7.
Figure 10A:
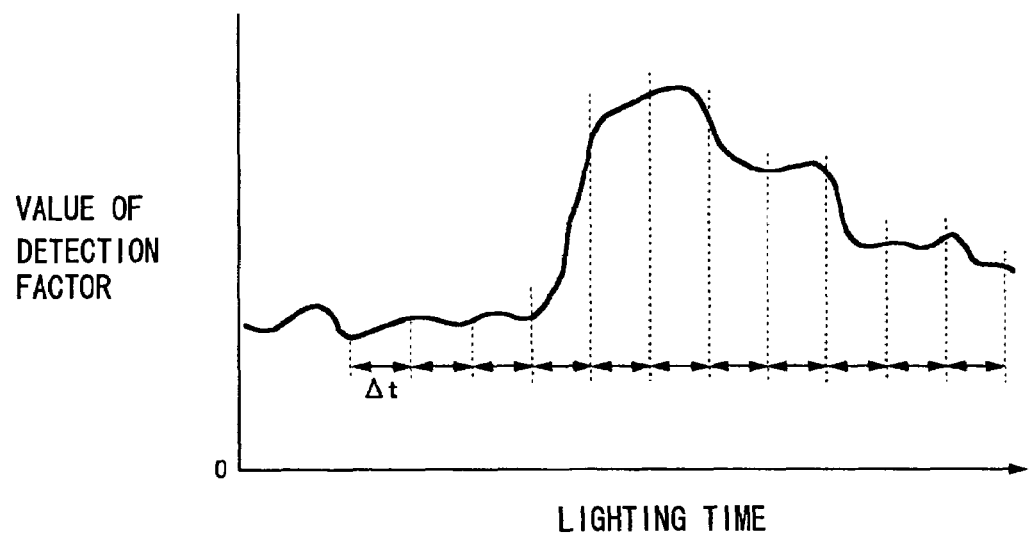
FIGS. 10(a) and 10(b) are explanatory diagrams concerning process of the flicker detection function of FIG. 7.
Figure 10B:
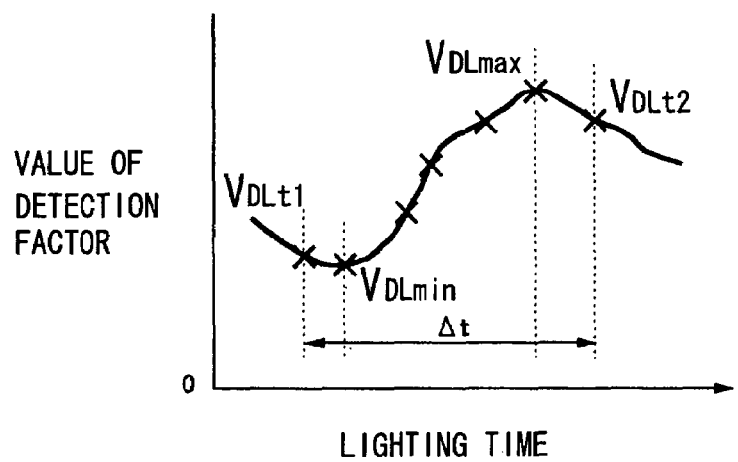

More specifically, as shown in FIGS. 9, 10(a) and 10(b), the flicker detection function reads digital values (values of detection factors) from each of the A/D converters 23a-23c (S11), and finds change value in its digital output per unit time Δt (S12). In case that this change vale is equal to or larger than a prescribed value (reference value), the function detects flicker generation. For example, when digital values corresponding to the lamp voltage change such as $V_{DLt1}$, $V_{DLmin}$, ..., $V_{DLmax}$, $V_{DLt2}$, etc, the change value is calculated from an absolute value of difference between the maximum value $V_{DLmax}$ and the minimum value $V_{DLmin}$. The unit time Δt may be the time period TM of FIG. 8. The change value is not limited to that of FIG. 10(b), and may be substituted by a value such as an absolute value of difference between two digital values that are continuously picked up at sampling period of the A/D converter, or the like.

In case that the flicker detection function detects flicker generation, the control changeover function 230a changes lamp power control to the high power control for a prescribed time period through the timer function, and changes lamp power control to the constant power control after the prescribed time period is passed.

The operation of the ballast 20 is now explained. When the lamp DL2 starts in response to high voltage of the igniter, control for the lamp DL2 is changed to the lamp current control. When the lamp DL2 then reaches a stable state, the lamp current control is changed to the constant power control.

Afterward, in case that temperature of the electrodes or within the bulb of the lamp DL2 falls in response to decrease of the lamp current and flick generation is detected, the constant power control is changed to high power control for the prescribed time period.

Thus, the ballast 20 according to the second embodiment of the invention changes the constant power control to the high power control based on detection of flick generation, and therefore it is possible to prevent decrease of the temperature of the electrodes or within the bulb. Also, since the decrease of the temperature of the electrodes or within the bulb causes visible flicker, the flicker generation can be prevented. Even if flicker immediately stops after the constant power control is changed to the high power control, the high power control is continued for the prescribed time period, so that the temperature of the electrodes or within the bulb can be raised sufficiently. Inversely, if flicker does not stop during the prescribed time period, the high lamp power control is changed to the constant power control, and therefore it is possible to prevent useless power consumption occurred by increasing power over needlessly long hours. In case that the ballast 20 is utilized for lighting, the lighting that gives little flicker and does not bring discomfort is possible. In case that the ballast 20 is utilized for a projector such as a liquid crystal projector or the like, even if its light source is a light source that is approximate to a point source, it is possible to obtain a stable light output with little flicker.

In an alternate embodiment, the control changeover function 230a changes lamp power control to the high power control in case that the flicker detection function detects flicker generation, and changes lamp power control to the constant power control in case that flicker generation is not detected. This changeover control can be added to the second embodiment, and any control can be selected.

In another alternate embodiment, the flicker detection function of the function 230a detects flicker generation when a change value in at least two detection factors per unit time is equal to or greater than a prescribed value.

Figure 11:
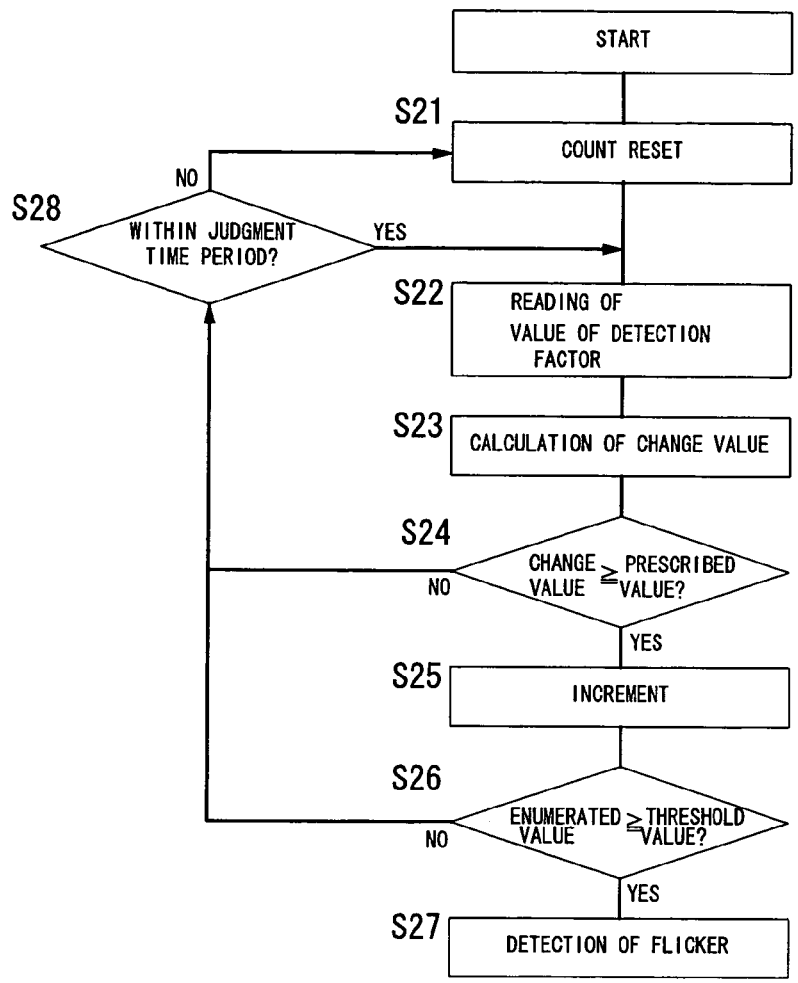
FIG. 11 illustrates an operation example of the flicker detection function of FIG. 7.
Figure 12:
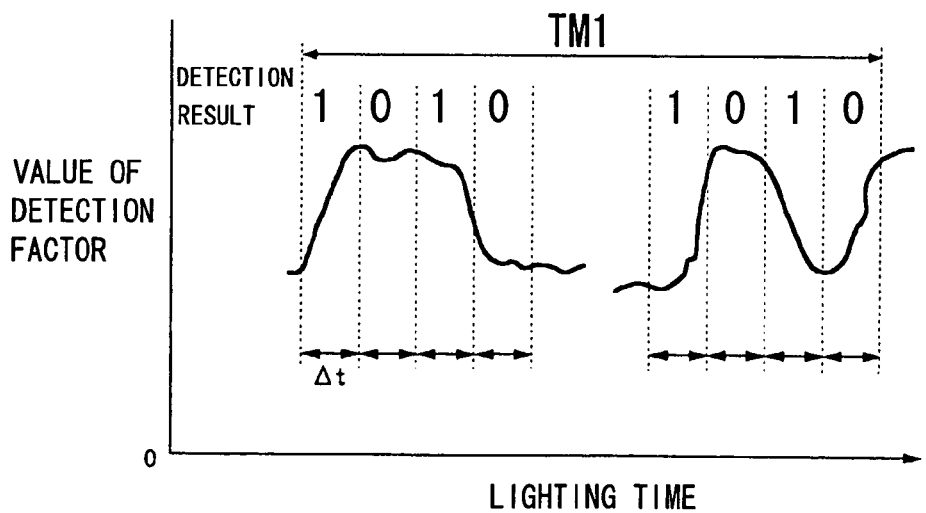
FIG. 12 is an explanatory diagram concerning another process of the flicker detection function of FIG. 7.

In another alternate embodiment, as shown in FIGS. 11 and 12, the flicker detection function of the function 230a finds the number of cases in which the above change value becomes equal to or greater than the above prescribed value every judgment time period longer than the unit time, and detects flicker generation when the number of cases is equal to or greater than a specified number of times (threshold value). Generally, visible flicker occurs in case that the light output varies at a frequency within 3-15 Hz, and therefore it is preferable that the judgment time period TM1 is set for 1 second and the threshold value is set within the range of 3-15 times.

In FIG. 11, an enumerated value is first reset at step S21. A value of detection factor in unit time Δt is then read (S22), and a change value is calculated (S23). The change value is then compared with the prescribed value (S24). When the change value is equal to or larger than the prescribed value (YES at S24), increment, for example, 1 (see FIG. 12) is added to the enumerated value (S25), and step S26 is proceeded to. When the change value is smaller than the prescribed value (NO at S24), step S28 is proceeded to.

At step S26, when the enumerated value is equal to or larger than the threshold value (YES at step 26), flicker generation is detected (S27). When the enumerated value is smaller than the threshold value (NO at step 26), step S28 is proceeded to. At step S28, the step is returned to step S22 when time elapsed is within the judgment time period TM1 (YES at S28), where the time elapsed is time elapsed from a point in time that the enumerated value is reset (S21), and is given by Δt×"the number of times that step S28 is proceeded to". When the time elapsed is not within the judgment time period TM1 (NO at S28), the step is returned to step S21.

Figure 13A:
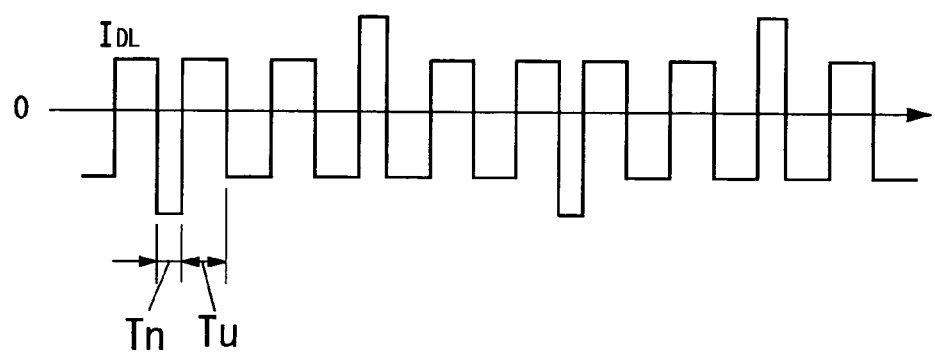
FIGS. 13(a) and 13(b) are explanatory diagrams concerning another control for the ballast of FIG. 7.
Figure 13B:
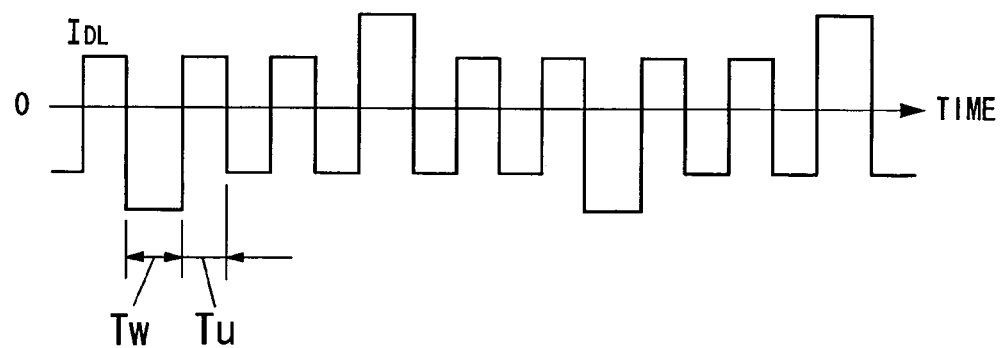

In another alternate embodiment, in case of the high power control, the high power control function 230d is operable to control the on/off period of the switching element of the DC-DC converter 211 so as to increase the lamp current $I_{DL}$ provided by component of at least a half-period of the square wave voltage while the number of half-period pulses of the square wave voltage reaches a specified number of times. As shown in FIGS. 13(a) and 13(b), by controlling the on/off period of each switching element of the inverter 213, a time period Tn or Tw for increasing the lamp current $I_{DL}$ is set for time that is different from the other time period Tu. In FIG. 13(a), the time period Tn is set shorter than the other time period Tu, and in FIG. 13(b), the time period Tw is set longer than the other time period Tu. Since the increase rate of the lamp current $I_{DL}$ and the time of the half period depend on the ballast, it is possible to supply a desired lamp current $I_{DL}$ to the lamp DL2 by increasing or decreasing the time period Tn or Tw for increasing the lamp current $I_{DL}$. For example, in case of a HID lamp that is subjected to a harmful influence on the electrodes when the time period Tn equals the other time period Tu, the influence on the electrodes can be reduced by making the time period Tn shorter than the time period Tu. If the time period Tw is made equal to the time period Tu, there are cases in which required energy can not be supplied to the lamp because the lamp current $I_{DL}$ of the lamp has the upper limit value, but it is possible to cope with that by making the time period Tw longer than the time period Tu.

THIRD EMBODIMENT

Figure 14:
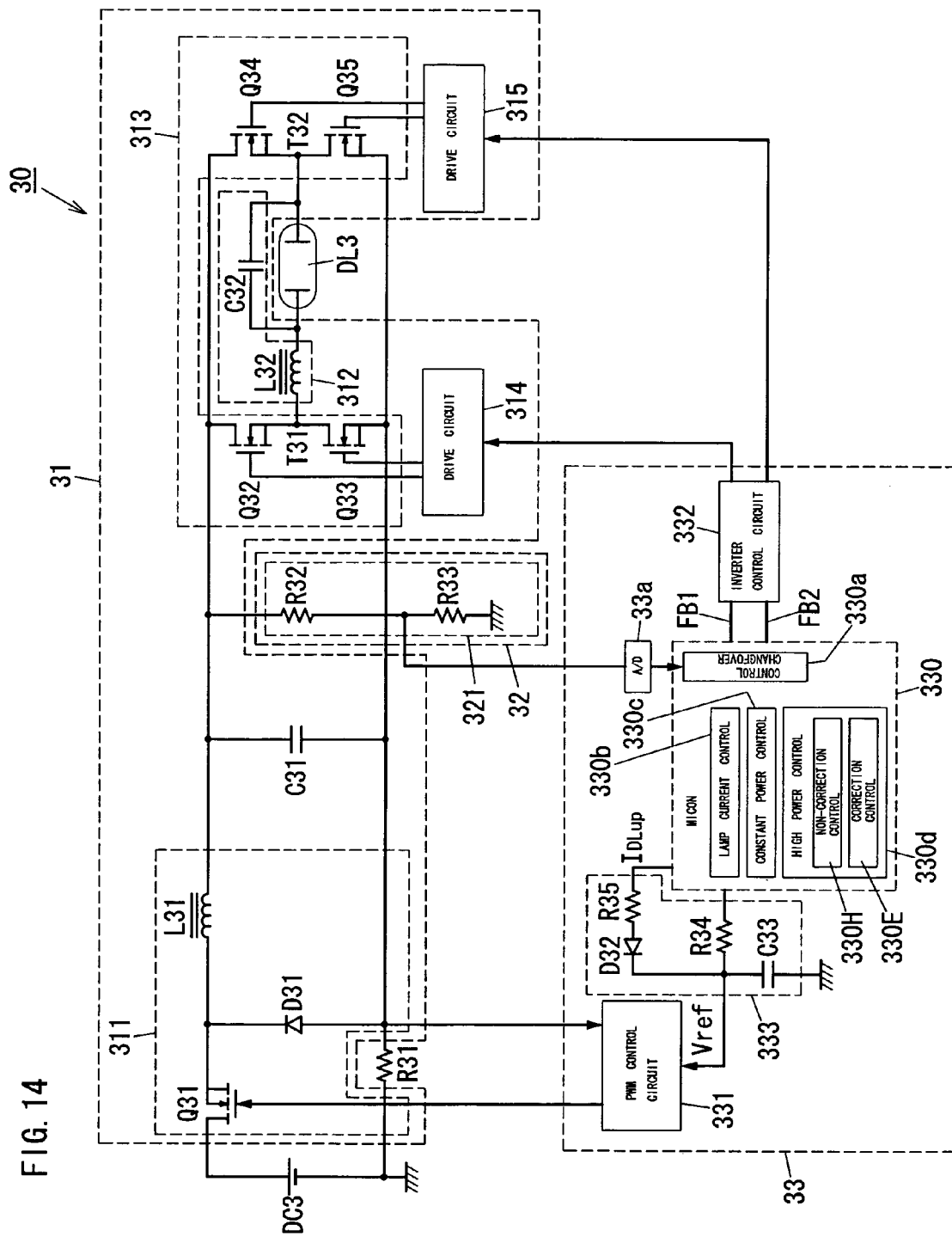
FIG. 14 is a circuit diagram of a discharge lamp ballast in accordance with a preferable third embodiment of the invention.

FIG. 14 shows a discharge lamp ballast 30 for a HID lamp (e.g., extra-high-pressure mercury discharge lamp of 120-300 W) DL3. The ballast 30 is characterized by a control circuit 33, and different from the first embodiment that the control circuit 13 is constructed of the A/D converter 13a, the micon 130, the PWM control circuit 131 and the inverter control circuit 132.

In this third embodiment, the control circuit 33 comprises a micon 330 and an integration circuit 333 in addition to an A/D converter 33a, a PWM control circuit 331 and an inverter control circuit 332.

The micon 330 is characterized by a high power control function 330d with a non-correction control function 330H and a correction control function 330E, and a control changeover function 330a in comparison with the micon 130 of the first embodiment.

The non-correction control function 330H is operable to control the on/off state of the switching element Q31 so that a part of lamp power provided for the lamp DL3 is increased more than that adjusted by the constant lamp power control of the constant power control function 330c.

Figure 15:
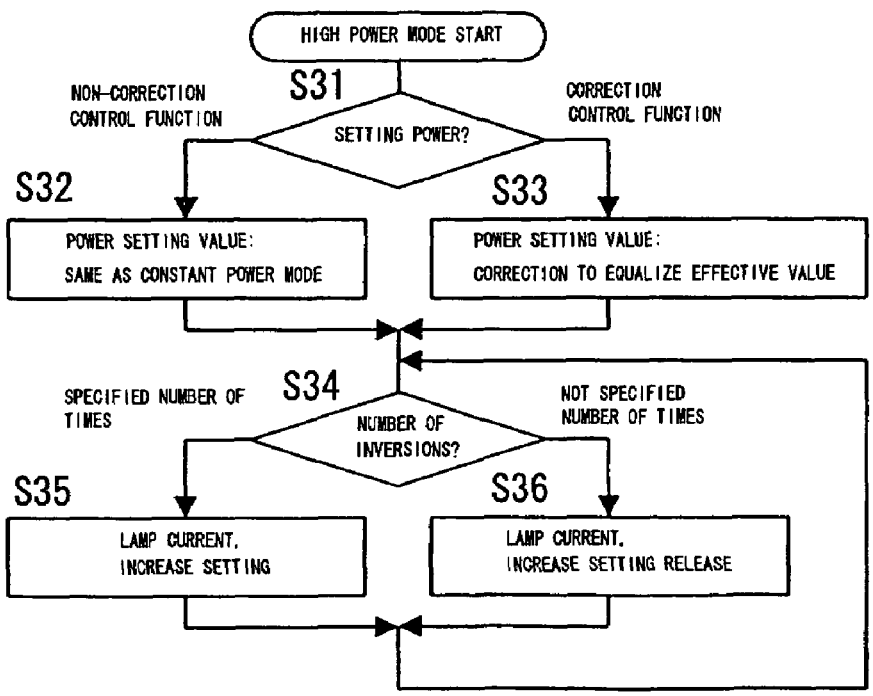
FIG. 15 illustrates an operation of a high power control function in the ballast of FIG. 14.
Figure 16:
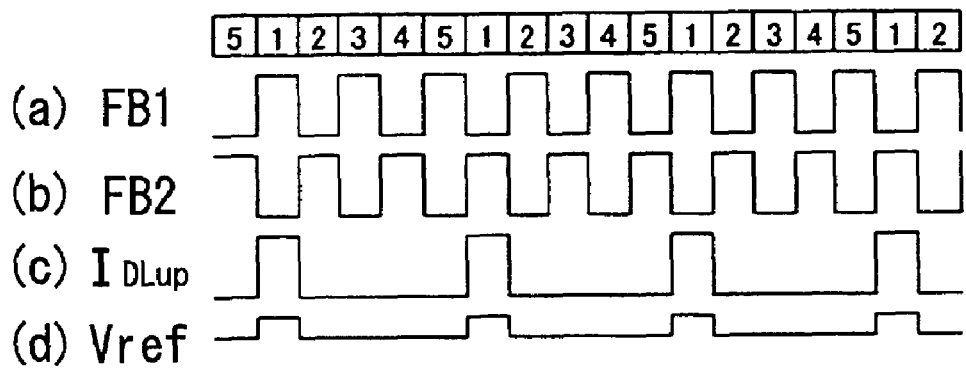
FIG. 16 is an explanatory diagram concerning an operation of a micon in the ballast of FIG. 14.
Figure 17A:
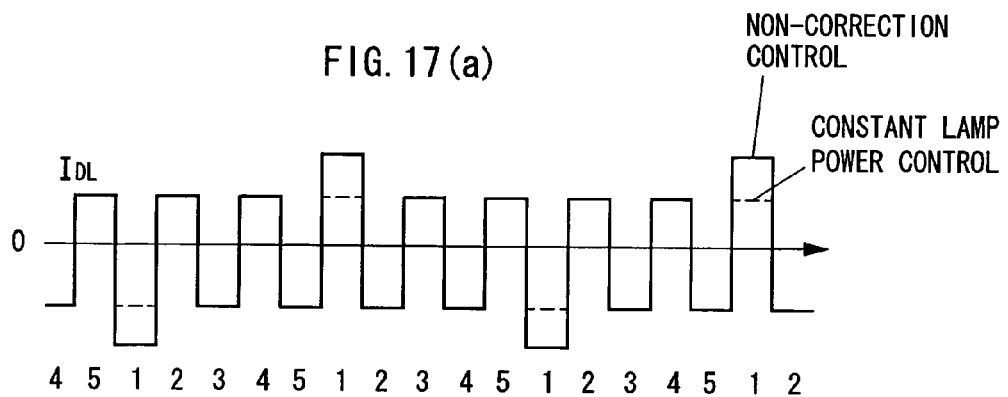
FIGS. 17(a)-17(c) are explanatory diagrams concerning process of a non-correction control function in the ballast of FIG. 14.
Figure 17B:
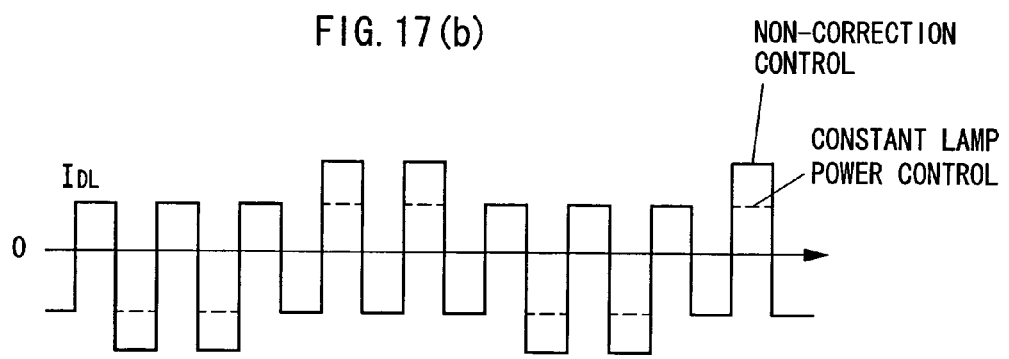
Figure 17C:
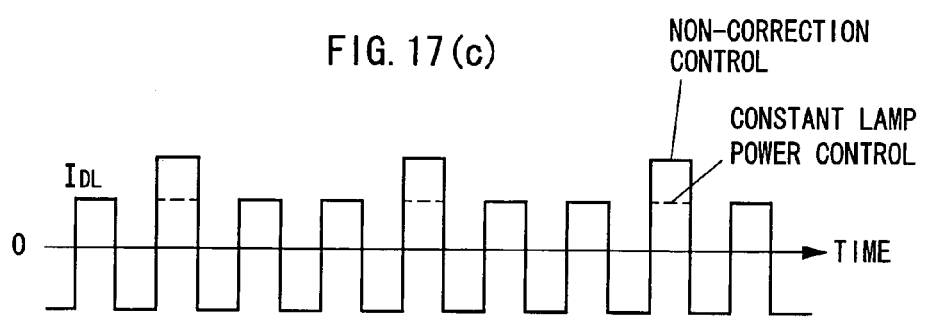

In examples of FIGS. 15, 16 and 17(a), according to the procedure of step S32 and S34-S35, the function 330H provides the integration circuit 333 with a pulse signal $I_{DLup}$ for power increase in order to increase the peak value (wave height value) of part of the lamp current $I_{DL}$, and thereby increases the effective value of the lamp current $I_{DL}$. The signal $I_{DLup}$ is provided m-times to the circuit 333 while the number of half-period pulses of output voltage of the inverter 313 reaches a specified number of times n, where m and n are integers. In FIG. 17(a), m and n are set to 1 and 5, respectively. In this non-correction control, the control in the period of time that the signal $I_{DLup}$ is not provided is the same as the constant power control, and therefore the effective value of the lamp current $I_{DL}$ increases in response to the period of time that the signal $I_{DLup}$ is provided. However, not limited to the setting, as shown in FIG. 17(b), the function 330H may provide two times (first and third half-periods) the signal $I_{DLup}$ for the circuit 333 while the number of half-period pulses reaches 5. Thus, by setting n to an odd number, the effective value of the positive and negative lamp current $I_{DL}$ can be increased, and it is possible to make electrodes of the lamp DL3 substantially equal in degradation. Also, as shown in FIG. 17 (c), the function 330H may provide once the signal $I_{DLup}$ for the circuit 333 while the number of half-period pulses reaches 6. Thus, by setting n to an even number, temperature of one electrode rises solely, and therefore in case that there is bias in temperature distribution of the electrodes, it is possible to raise temperature of the electrode with lower temperature, so that uneven in temperature distribution can be removed.

The correction control function 330E is operable to control the on/off state of the switching element Q31 so that a part of lamp power provided for the lamp DL3 is increased more than that adjusted by the constant power control of the function 330c while equalizing the effective value of the lamp power provided for the lamp DL3 with that adjusted by the constant power control.

Figure 18A:
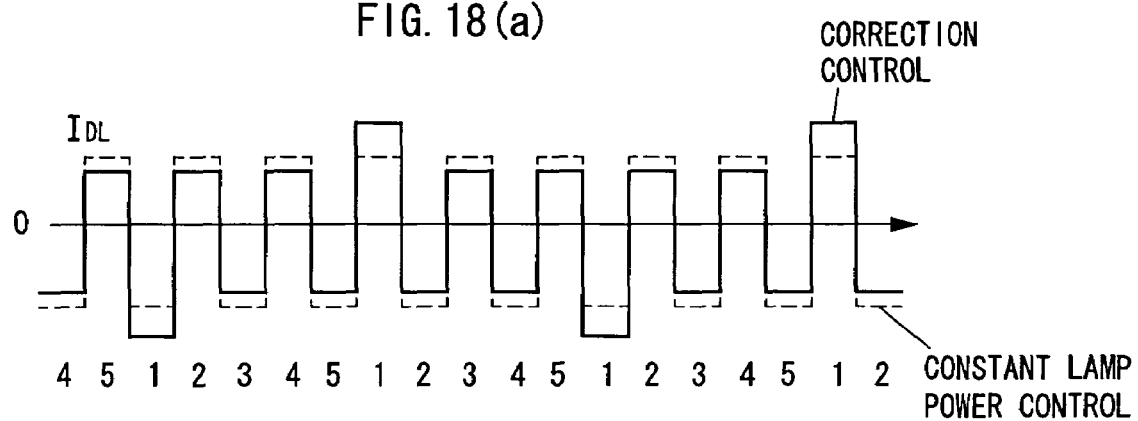
FIGS. 18(a)-18(c) are explanatory diagrams concerning process of a correction control function in the ballast of FIG. 14.
Figure 18B:
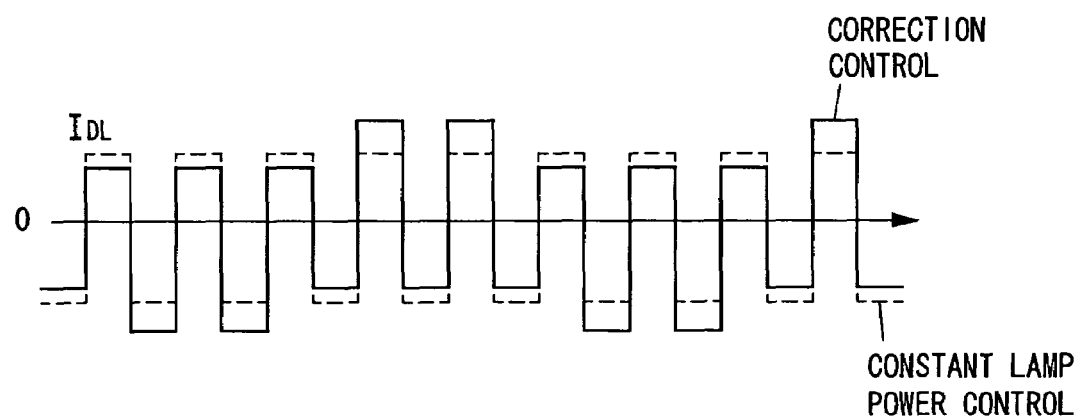
Figure 18C:
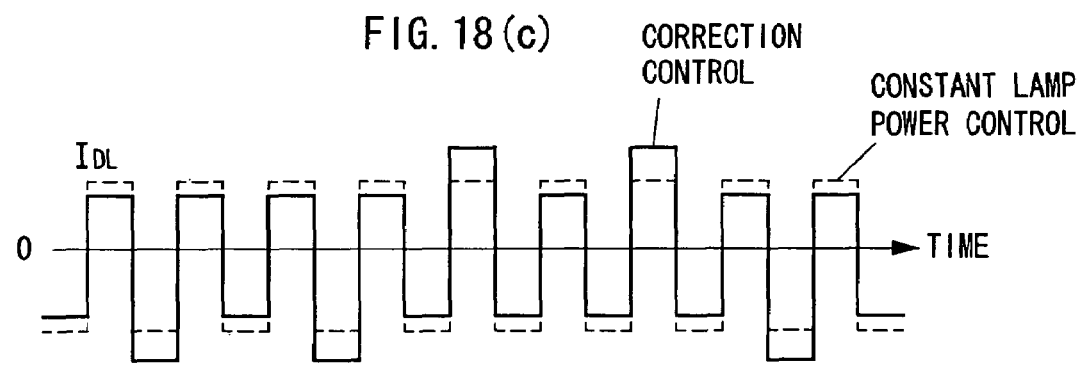
Figure 19A:
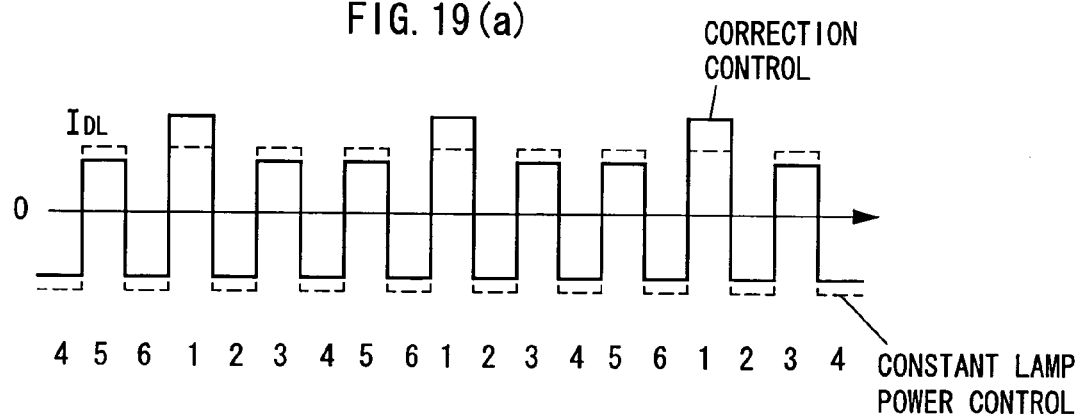
FIGS. 19(a)-19(c) are explanatory diagrams concerning process of the non-correction control function in the ballast of FIG. 14.
Figure 19B:
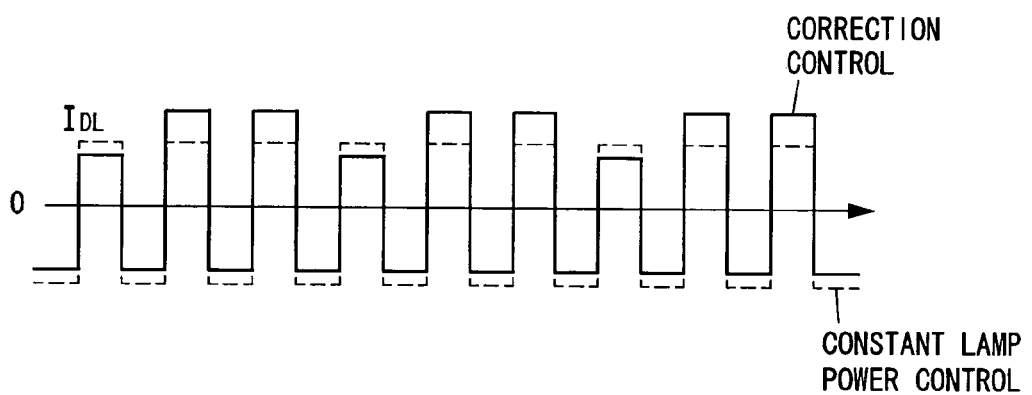
Figure 19C:
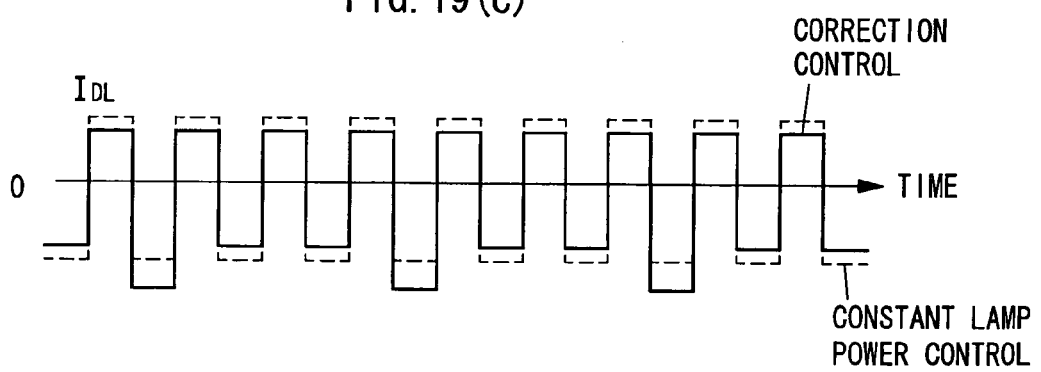

In examples of FIGS. 15, 16 and 18(a), according to the procedure of step S33 and S34-S35, the function 330E provides the integration circuit 333 with a pulse signal $I_{DLup}$ for power increase while providing the circuit 333 with a Vref adjustment signal for adjusting the level of DC voltage Vref applied to the PWM control circuit 331 from the circuit 333. In FIG. 18(a), the signal $I_{DLup}$ is provided for the circuit 333 and thereby the effective value of the lamp current $I_{DL}$ is increased as well, but by providing the Vref adjustment signal for the circuit 333, wave height values of the lamp current $I_{DL}$ in the whole period of time are decreased in response to increment of the effective value of the lamp current $I_{DL}$ by the signal $I_{DLup}$. As a result, the effective value of lamp power becomes equal to that adjusted by the constant power control. Thus, even if the effective value of lamp power is not increased, it is possible to raise temperature of the electrodes and within the bulb of the lamp DL3 by causing a part of lamp power provided for the lamp DL3 to be larger than that adjusted by the constant power control. Also, at changeover between the constant power control and the correction control, the effective value of lamp power is not changed, and therefore variation of the light output of the lamp DL3 can be prevented. FIGS. 18(a) and 18(b) correspond to FIGS. 17(a) and 17(b), respectively. In another example, as shown in FIG. 18(c), the function 330E may provide twice (first and fifth periods) the signal $I_{DLup}$ for the circuit 333 while the number of half-period pulses reaches 7. Thus, by providing the signal $I_{DLup}$ for the circuit 333, variance of duration for increase of the lamp current is possible. Moreover, as shown in FIG. 19(a)-19(c), the parameter n for the signal $I_{DLup}$ may be set to an even number. In FIG. 19(a), m and n are set to 6 and 1, respectively. In FIG. 19(b), m and n are set to 6 and 2, respectively. In FIG. 19(c), m and n are 6 and 1, respectively and the polarity of increased lamp current is inverse polarity as compared with FIG. 19(a).

In case that lamp power control is changed to the high power control, the control changeover function 330a is operable to change to control of the non-correction control function 330H or the correction control function 330E based on various changeover conditions (S31 in FIG. 15). In the third embodiment, the function 330a changes lamp power control to the control of the function 330H based on a non-correction changeover condition, namely, in case that the lamp voltage reaches or exceeds a threshold voltage (cf. Vt1 in FIG. 3). The function 330a also changes lamp power control to the control of the function 330E based on a correction changeover condition, namely, in case of a shift to dimming operation. However, not limited to this changeover control, in case that a state detection circuit and A/D converters are provided in the same way as the second embodiment, the control changeover function may change lamp power control to the control of the non-correction control function when the light output detection circuit detects flicker generation. Also, the function may change lamp power control to the control of the correction control function when a change value in digital output from a voltage division circuit or a current detection circuit is equal to or larger than a prescribed value, or when shifting a dimming operation.

The integration circuit 333 is constructed of resistors R34 and R35, a diode D32 and a capacitor C33, and located between the micon 330 and the PWM control circuit 331. When a pulse signal (Vref adjustment signal) with duty in response to voltage across the resistor R33 flows from the micon 330 to the resistor R34, the pulse signal is converted into DC voltage Vref through the resistor R34 and the capacitor C33. When the signal $I_{DLup}$ also flows from the micon 330 to the resistor R35, the DC voltage Vref provided for the circuit 331 is increased in response to the signal $I_{DLup}$.

As shown in FIG. 16, when the micon 330 provides the inverter control circuit 332 with two phases of signals FB1 and FB2 according to the timing of FIG. 16, the micon 330 (function 330H or 330E) counts the number of polarity inversions through the signals FB1 and FB2, where FB1 and FB2 are similar to control signals given from the circuit 332 to drive circuits 314 and 315. According to the timing of FIG. 16, the micon 330 then provides the resistor R35 with the signal $I_{DLup}$ that synchronizes with the signals FB1 and FB2. Accordingly, voltage (DC voltage Vref) across the capacitor C33 rises. The lamp current detected through the resistor R31 is controlled to be more increased as the DC voltage Vref is higher. Increment of the lamp current according to the signal $I_{DLup}$ is adjusted through resistance of the resistor R35.

Efficiency of increase of the lamp current $I_{DL}$ is low when time of half period for increasing the current $I_{DL}$ is short, and load on the electrodes is large when the time of half period is long, so that it is preferable that the time is set for about 0.5-50 ms. Preferably, the lamp current $I_{DL}$ in a half period when the current $I_{DL}$ is not increased is utilized as a reference value, and an increase rate of the current $I_{DL}$ is set to be increased about 5-60% with respect to the reference value.

However, efficacy by increase of the lamp current $I_{DL}$ in the high power control mutually relates to the time of half period and the increase rate of the current $I_{DL}$, and therefore it is necessary to decide the optimal value in consideration for characteristics of the lamp DL3. An experimental example is explained. A HID lamp DL3 was used and its rated lamp power was 150 W. The frequency of output voltage of the inverter 313 was set to 170 Hz, and each power of 135 W, 140 W and 145 W was provided to the lamp DL3. And the lamp DL3 was operated for one hour while keeping the peak value of the lamp current $I_{DL}$. Also, like the non-correction control shown in FIG. 17, n and the increase rate were respectively 5 and 30%, and the lamp DL13 was operated for one hour while increasing the peak value of the lamp current $I_{DL}$ in a half period more than that in the other period of time while the number of half-period pulses of output voltage reached 5. In case that the peak value of the lamp current $I_{DL}$ was kept to be constant, arc jumping occurred over a comparatively long time. The arc jumping means a phenomenon that end position of the arc is not stable and moves here and there, resulting change in the light output. On the contrary, in case of the non-correction control, arc jumping did not occur.

The ballast 30 according to the third embodiment of the invention is able to prevent flicker generation by changing to the control of the non-correction control function 300H, and also to prevent flicker generation and variation of the light output by changing to the control of the correction control function 330E.

In an alternate embodiment, the micon 330 comprises only the correction control function 330E in the high power control function 330d. In this configuration, the control changeover function 330a changes lamp control to the lamp current control till the lamp voltage reaches voltage of the rated lower limit (see table 1 described later) of the rated lamp voltage after the start of the lamp DL3, and also changes lamp power control to the correction control or the constant power control in case of rated operation and dimming operation. Concretely, the function 330a changes to the correction control of the function 330E when the lamp voltage is voltage within the rated range (see table 1 described later), and also changes to the constant power control of the constant power control function 330c when the lamp voltage is voltage lower than the voltage of the rated lower limit. This control is suitable for projectors. For example, when temperature within a projector rises and lamp voltage drops to voltage lower than the voltage of the rated lower limit, lamp power control is changed from the correction control of the high power control to the constant lamp power control and therefore the temperature within the projector can be lowered.

FOURTH EMBODIMENT

Figure 20:
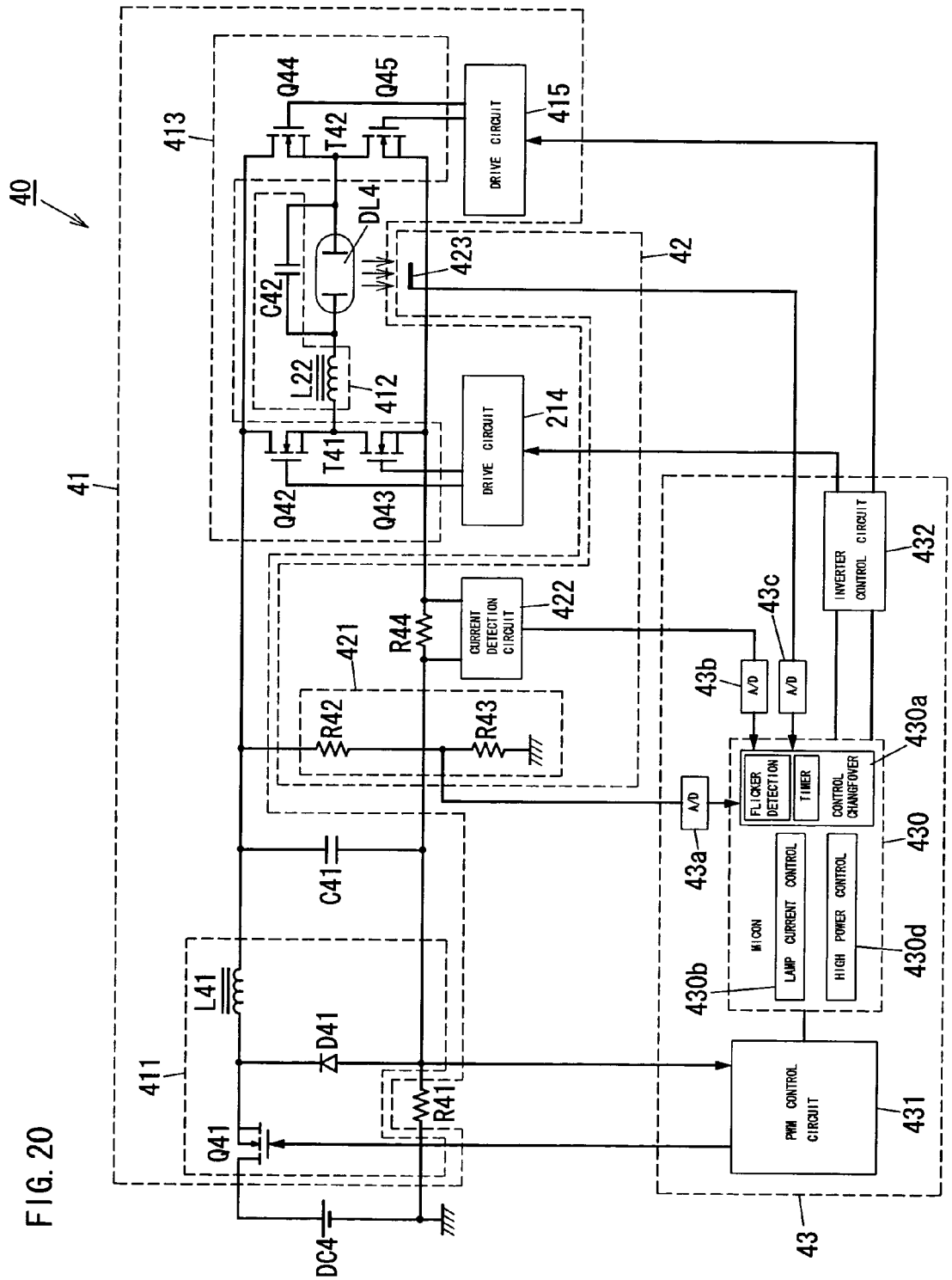
FIG. 20 is a circuit diagram of a discharge lamp ballast in accordance with a preferable fourth embodiment of the invention.

FIG. 20 shows a discharge lamp ballast 40 for a HID lamp (e.g., extra-high-pressure mercury discharge lamp of 120-300 W) DL4. The ballast 40 is characterized by a control changeover function 430a and a high power control function 430d of a micon 430, and is not provided with a constant power control function in the micon 430 as compared with the second embodiment.

Figure 21:
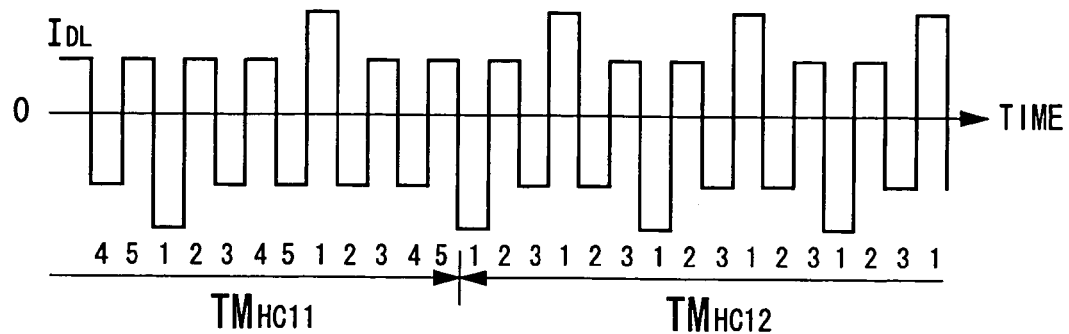
FIG. 21 is an explanatory diagram concerning process of a control changeover function and a high power control function in the ballast of FIG. 20.

As shown in FIG. 21, the control changeover function 430a is operable to change to first high power control (cf. a period of time $TM_{HC11}$ of FIG. 21) of the high power control function 430d at stabilization of the lamp DL 4, and change lamp power control to the first high power control or second high power control (cf. a period of time $TM_{HC12}$ of FIG. 21) of the function 430d based on detection result of the state detection circuit 42.

The high power control function 430d is operable to control the on/off state of the switching element Q41 so that at least one of an effective value and a peak value of the lamp power provided for the lamp DL4 is increased more than that adjusted by constant power control based on the first high power control. The function 430d is also operable to change frequent degree of increase of the lamp current through the lamp DL4 so that lamp power under the second high power control becomes larger than that under the first high power control based on the second high power control.

More specifically, the control changeover function 430a changes the first high power control to the second high power control according to shift conditions from the first high power control to the second high power control, namely, in case that lamp voltage is within a specified range (from threshold voltage to the upper limit voltage with respect to circuit operation) in dimming operation, in case that a supply of power to the HID lamp is reduced, in case that prescribed time passes after the lamp turn-on, in case that accumulated lighting time of the lamp reaches prescribed time, or in case that flicker or arc jumping is detected.

The function 430a changes the second high power control to the first high power control according to shift (return) conditions from the second high power control to the first high power control, namely, in case that lamp voltage is out of the specified range and lower than the lower limit during dimming operation, in case that a supply of power to the lamp is increased, in case that prescribed time passes after shift from the first high power control to the second high power control, or in case that flicker or arc jumping is not detected. However, not limited to the case that flicker or arc jumping is not detected, an alternative condition that prescribed time passes after shift to the second high power control owing to flicker or arc jumping may be utilized. According to this alternative condition, it is possible to prevent excessive stress that is added on circuit elements by that the second high power control continues without stopping when flicker or arc jumping occurs owing to degradation of the lamp or the like. Besides the abovementioned examples, the above shift conditions can be set suitably.

The accumulated lighting time is measured with a timer that accumulates lighting time (from power on to power off) of the HID lamp. For arc jumping, by locating a photoelectric sensor in proximity to the lamp to monitor luminance difference within a specified short time, generation of arc jumping can be detected when the difference continuously exceeds a threshold value for prescribed time. The flicker detection function is utilized for detection of arc jumping. The accumulated lighting time is increase only, and is not included in the return conditions.

Based on the above shift conditions, the table 1 is obtained by summarizing relation between the first high power control and the second high power as well as lamp voltage and prescribed power (rated operation or dimming operation) of the lamp.

TABLE 1

|  | Lower than rated lower limit | Rated range | Higher than rated upper limit |
|---|---|---|---|
| Rated operation | First high power control (mode) | First high power control (mode) | Second high power control (mode) |
| Dimming operation | First high power control (mode) | Second high power control (mode) | Second high power control (mode) |

In the table 1, the "Rated range" means a range including rated lamp voltage in consideration of dispersion in characteristics of HID lamps. The rated lower limit and the rated upper limit correspond to the lower limit and the upper limit of the rated range, respectively.

The above frequent degree is next explained. For change methods of the frequent degree, as shown in FIG. 21, besides a method that the above parameter (specified number of times) n is changed, there is a method that the number of times (m) of increase of the lamp current per unit period of time is changed. In the fourth embodiment, in case of the first high power control, the high power control function 430d increases the lamp current only for one half period while the number of half-period pulses of square wave voltage reaches 5. In case of the second high power control, the function 430d increases the lamp current only for one half period while the number of half-period pulses of square wave voltage reaches 3. Such changeovers may be at least three sorts of changeovers. For example, in a condition that supply of power to the lamp becomes minimum, namely the condition of "Dimming operation, Higher than rated upper limit", the unit period of time may be set for a period of time that the number of half-period pulses reaches 5, and the lamp current of each half period of two inversions in the unit period of time may be increased more than that of the other period of time in the unit period of time. But, due to the dimming operation, it is necessary to adjust amplitude of the square wave voltage so that the effective value of the lamp current lowers more than that of the rated operation.

The ballast 40 according to the fourth embodiment of the invention changes lamp power control to the first high power control or the second high power control from stabilization of the lamp DL4 and therefore flicker generation and variation of the light output can be prevented.

Figure 22:
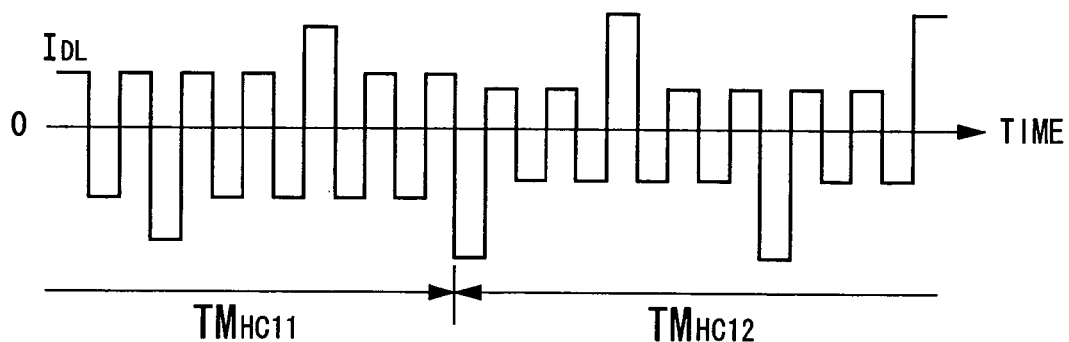
FIG. 22 is an explanatory diagram concerning another process of the control changeover function and the high power control function of FIG. 20.

In an alternate embodiment, as shown in FIG. 22, in case of changeover from the first high power control to the second high power control, the high power control function 430d is operable to change peak(wave height value) of the lamp current through the lamp DL4 so that lamp power under the second high power control is larger than that under the first high power control. In FIG. 22, the peak value of lamp power under the second high power control is set larger than that under the first high power control, and the effective value of lamp power under the second high power control is set to be equal to that under the first high power control. Such changeovers may be at least three sorts of changeovers. For example, third high power control is prepared, its peak value is made larger than that of the second high power control, and the effective value of lamp power under the high power control is made equal to that under the first or the second high power control. And any of the first high power control to the third high power control can be selected based on detection result of the state detection circuit 42.

Figure 23:
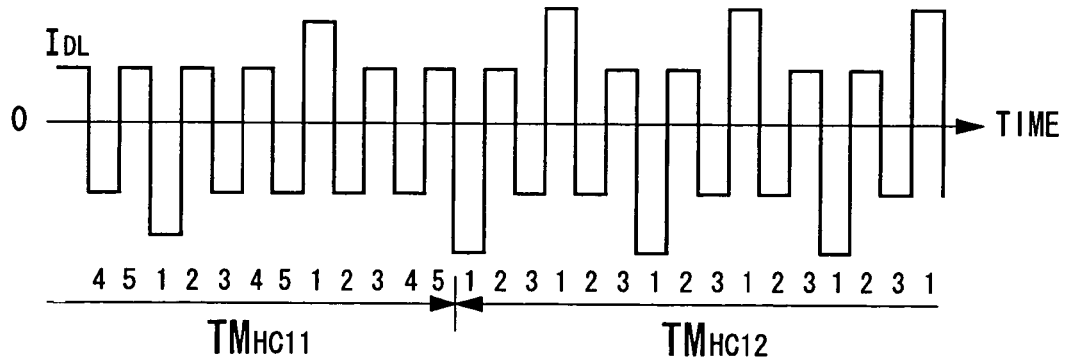
FIG. 23 is an explanatory diagram concerning another process of the control changeover function and the high power control function of FIG. 20.

In another alternate embodiment, as shown in FIG. 23, in case of changeover from the first high power control to the second high power control, the high power control function 430*d* is operable to change frequent degree of increase of the lamp current and peak of the lamp current so that lamp power under the second high power control is larger than that under the first high power control. Thus, even if deviation from the control range occurs under single factor change only, it is possible to set to target output so as to prevent the deviation from the control range by combining factors. The target output range can be also spread and, for example, a dimming range can be spread.

FIFTH EMBODIMENT

Figure 24:
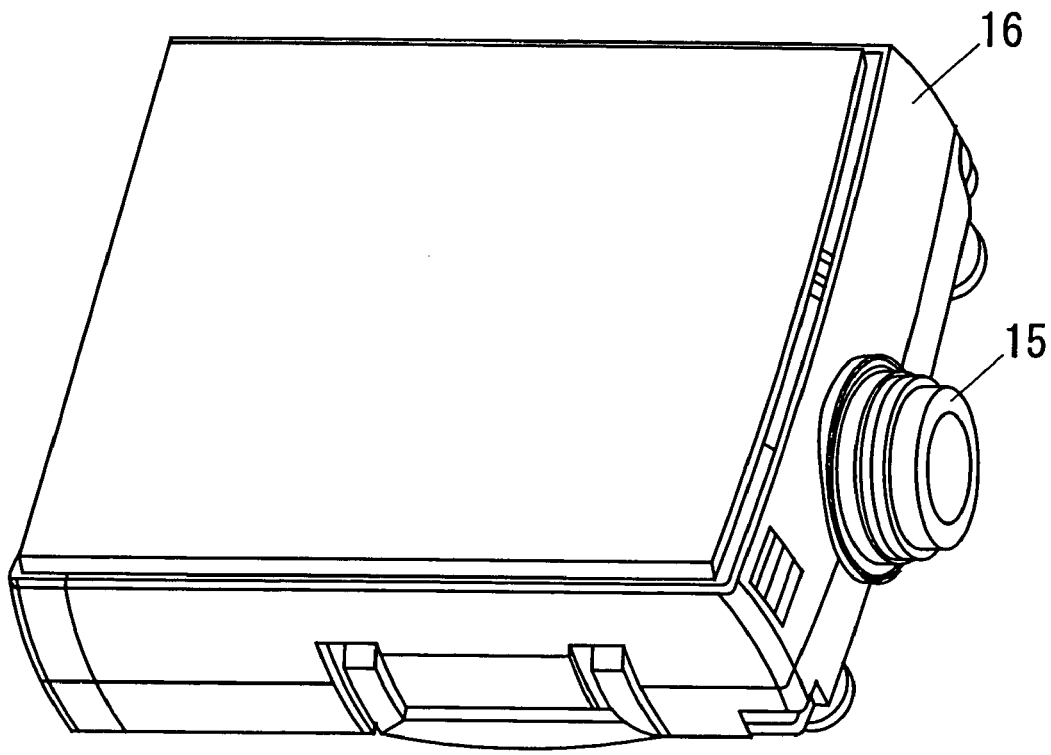
FIG. 24 illustrates a projector in accordance with a preferable fifth embodiment of the invention.
Figure 25:
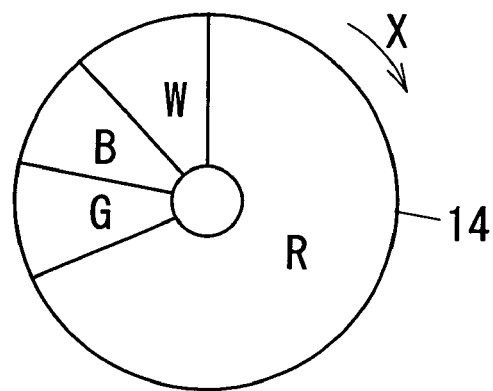
FIG. 25 is a front view of a construction example of a color filter utilized in the projector of FIG. 24.

FIG. 24 shows a projector equipped with a discharge lamp ballast. As shown in FIGS. 24 and 25, this projector includes any discharge lamp ballast of the above embodiments, the HID lamp as a light source and a color filter 14 whose transmission color by light from the light source is timewise changed with a prescribed period, and operates with, for example, DLP (registered trademark) system that utilizes DMD (digital micro mirror device). The ballast, the lamp and the filter 14 are enclosed in a housing 16 together with a projection lens 15, the DMD, fan(s) and so on.

The color filter 14 is a disk shape and located in front of the light source, and light that passes through the filter 14 is reflected at the DMD. The filter 14 is divided into regions of red (R), green (G), blue (B) and colorless (W), and rotates at a constant period in direction of the arrow X of FIG. 25. Accordingly, as shown in (a) of FIG. 26, transmission color of the filter 14 changes such as red (R), green (G), blue (B) and colorless (W) as time elapses.

Timing for changing polarity of voltage applied across the light source is synchronized with borders of each color region in the filter 14. Accordingly, light that passes through each color region in the filter 14 does not become light whose light output is dropped at changeover of the polarity, so that it is possible to efficiently utilize light emitted from the light source. However, in each color region in the filter 14, the red region is larger than any of the other regions in area, and the period of time that light from the light source passes through the red region is longer than a period of time that light from the light source passes through any of the other regions. Therefore, in the period of time that the light passes through the red region, the polarity is changed.

Figure 26:
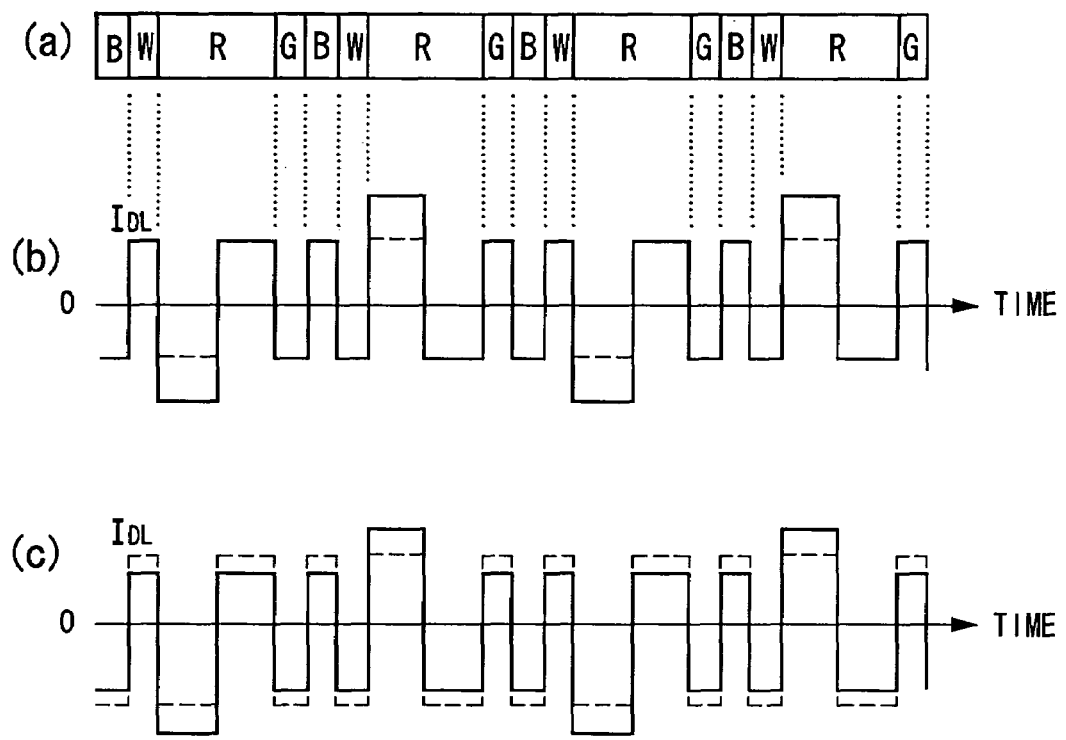
FIG. 26 is an explanatory diagram concerning operation of the projector of FIG. 24.

As shown in (b) and (c) of FIG. 26, in the period of time that the light passes through the red region, the lamp current $I_{DL}$ is increased more than that in any of the other period of times, but in a period of time that the light passes through one of the other regions, the lamp current may be increased more than that in another of the other period of times. In period of times corresponding to at least two regions, the lamp current may be also increased more than that in another of the other period of times. In (b) of FIG. 26, the effective value of the lamp current $I_{DL}$ under the high power control (solid line) is set to a value larger than that under the constant power control (broken line). In (c) of FIG. 26, the effective value of the lamp current $I_{DL}$ under the high power control (solid line) is set to a value equal to that under the constant power control (broken line). A color filter without colorless region (W) can be replaced with the filter 14. But not limited to the projector of the fifth embodiment, each ballast of the above embodiments can be used for various projectors.

Although the present invention has been described with reference to certain preferred embodiments, numerous modifications and variations can be made by those skilled in the art without departing from the true spirit and scope of this invention. For example, the embodiments include power MOSFETs, but in addition to switching elements such as IGBTs or the like, bipolar transistors and diodes may be used instead of the power MOSFETs. Also, in another example, the DC power source may be a DC power source that rectifies AC power.

The embodiments include the voltage step down converters since voltage of each DC power source DC1 is higher than lighting voltage of each HID lamp, but a DC-DC converter with other construction (e.g., voltage step up/down converter including switching elements) may be used instead of the voltage step down converter in response to the sort of the lamp. The embodiments include inverters, but in case that a HID lamp is a DC lamp, it is possible to omit the inverter.

The invention claimed is:

1. A discharge lamp ballast, comprising:
   a power converter that includes at least one switching element and is connected between a power source and a high intensity discharge lamp; and
   a control circuit that controls an on/off state of the switching element so as to provide prescribed lamp power for the lamp based on lamp power control after the start of the lamp;
   wherein, after the start of the lamp, the control circuit is configured:
   (i) to control the on/off state of the switching element by lamp current control; and then
   (ii) based on high power control, to control the on/off state of the switching element so that at least one of an effective value and a peak value of the lamp power provided for the lamp is increased more than that adjusted by constant power control, said constant power control being control for adjusting the effective value of the lamp power provided for the lamp to a prescribed power value.

2. The ballast of claim 1, wherein the control circuit controls the on/off state of the switching element based on the high power control for a prescribed time period immediately after reaching a stable state of the lamp.

3. The ballast of claim 1, wherein after reaching a stable state of the lamp, control for the on/off state of the switching element based on the constant power control and control for the on/off state of the switching element based on the high power control are performed alternately and periodically through the control circuit.

4. The ballast of claim 1, wherein the control circuit executes correction control or non-correction control as the high power control,
   wherein in case of the correction control, the control circuit controls the on/off state of the switching element so that a part of lamp power provided for the lamp is increased more than that adjusted by the constant power control while equalizing the effective value of the lamp power provided for the lamp with that adjusted by the constant power control,
   wherein in case of the non-correction control, the control circuit controls the on/off state of the switching element so that a part of lamp power provided for the lamp is increased more than that adjusted by the constant lamp power control.

5. The ballast of claim 1, wherein the power converter comprises: a converter that includes the switching element and converts voltage from the power source into DC voltage; and an inverter that includes switching elements and inverts the DC voltage from the converter into square wave voltage;

wherein in case of the high power control, the control circuit controls the on/off period of the switching element of the converter so as to increase a lamp current provided by component of at least a half-period of the square wave voltage while the number of half-period pulses of the square wave voltage reaches a specified number of times.

6. The ballast of claim 5, wherein the control circuit controls the on/off period of the switching elements of the inverter so that time of half-period in which the lamp current is increased differs from time of half-period in which the lamp current is not increased.

7. The ballast of claim 5, comprising a state detection means that detects a state of the lamp, wherein when the lamp current provided by the component of at least a half-period of the square wave voltage is increased, the control circuit changes frequent degree of increase of the lamp current based on the detection result of the state detection means.

8. The ballast of claim 5, comprising a state detection means that detects a state of the lamp, wherein when the lamp current provided by the component of at least a half-period of the square wave voltage is increased, the control circuit changes peak of the lamp current based on the detection result of the state detection means.

9. The ballast of claim 5, comprising a state detection means that detects a state of the lamp, wherein when the lamp current provided by the component of at least a half-period of the square wave voltage is increased, the control circuit changes frequent degree of increase of the lamp current and peak of the lamp current based on the detection result of the state detection means.

10. A projector, equipping with the lamp as a light source and the ballast of claim 1.

11. The projector of claim 10, comprising a color filter whose transmission color by light from the light source is timewise changed with a prescribed period, wherein the control circuit synchronizes timing of polarity inversion of lamp voltage applied across the lamp with timing that the transmission color of the filter is changed.

12. A discharge lamp ballast, comprising:

a power converter that includes at least one switching element and is connected between a power source and a high intensity discharge lamp; and a control circuit that controls an on/off state of the switching element so as to provide prescribed lamp power for the lamp based on lamp power control after the start of the lamp, wherein the control circuit controls the on/off state of the switching element so that at least one of an effective value and a peak value of the lamp power provided for the lamp is increased more than that adjusted by constant power control based on high power control after the start of the lamp, said constant power control being control for adjusting the effective value of the lamp power provided for the lamp to a prescribed power value, wherein the ballast comprises a state detection means that detects a state of the lamp, wherein the control circuit changes the lamp power control to the constant power control or the high power control based on a detection result of the state detection means after the start of the lamp, wherein: in case of the constant power control, the control circuit controls the on/off state of the switching element so as to adjust the effective value of the lamp power provided for the lamp to the prescribed power value;

while in case of the high power control, the control circuit controls the on/off state of the switching element so that at least one of the effective value and the peak value of the lamp power provided for the lamp is increased more than that of the constant power control.

13. The ballast of claim 12, wherein the prescribed power value is a rated power value of the lamp.

14. The ballast of claim 12, wherein the prescribed power value is a rated power value of the lamp and a dimming power value obtained from a dimming rate for the rated power value.

15. The ballast of claim 12, wherein:

the state detection means detects lamp voltage across the lamp; and the control circuit changes the lamp power control to the high power control in case that the detection result of the state detection means reaches or exceeds threshold voltage higher than rated lamp voltage of the lamp.

16. The ballast of claim 15, wherein the control circuit changes the lamp power control to the high power control while the detection result of the state detection means is equal to or higher than the threshold voltage, and changes the lamp power control to the constant power control while the detection result of the state detection means is lower than the threshold voltage.

17. The ballast of claim 15, wherein the control circuit changes the lamp power control to the high power control over a prescribed time period, and changes the lamp power control to the constant power control after the prescribed time period is passed, said prescribed time period being included in a period of time while the detection result of the state detection means is equal to or higher than the threshold voltage.

18. The ballast of claim 12, wherein:

the state detection means detects the state of the lamp for detecting flicker generation on the lamp; and the control circuit detects the flicker generation on the lamp based on the detection result of the state detection means, and changes the lamp power control to the high power control in case that the flicker generation is detected.

19. The ballast of claim 18, wherein the control circuit changes the lamp power control to the high power control while the flicker generation is detected, and changes the lamp power control to the constant power control while the flicker generation is not detected.

20. The ballast of claim 18, wherein the control circuit changes the lamp power control to the high power control for a prescribed time period in case that the flicker generation is detected, and changes the lamp power control to the constant power control after the prescribed time period is passed.

21. The ballast of claim 18, wherein the state detection means is constructed of at least one means of: a means that detects lamp voltage applied across the lamp; a means that detects lamp current supplied to the lamp; and a means that detects a light output of the lamp.

22. The ballast of claim 18, wherein the control circuit detects flicker generation when a change value in the detection result is equal to or greater than a prescribed value, said change value being a value per unit time.

23. The ballast of claim 22, wherein the control circuit finds the number of cases in which the change value becomes equal to or greater than the prescribed value every a judgment time period longer than the unit time, and detects flicker generation when the number of cases is equal to or greater than a specified number of times.

* * * * *